United States Patent
Wang et al.

(10) Patent No.: US 12,302,407 B2
(45) Date of Patent: May 13, 2025

(54) TECHNIQUE FOR CONFIGURING A RANDOM ACCESS PROCEDURE

(71) Applicant: Telefonaktiebolaget LM Ericsson (publ), Stockholm (SE)

(72) Inventors: Min Wang, Luleå (SE); Jinhua Liu, Beijing (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 539 days.

(21) Appl. No.: 17/290,244

(22) PCT Filed: Oct. 30, 2019

(86) PCT No.: PCT/EP2019/079718
§ 371 (c)(1),
(2) Date: Apr. 29, 2021

(87) PCT Pub. No.: WO2020/089328
PCT Pub. Date: May 7, 2020

(65) Prior Publication Data
US 2021/0378027 A1    Dec. 2, 2021

(30) Foreign Application Priority Data

Oct. 30, 2018  (WO) ................ PCT/CN2018/112577

(51) Int. Cl.
*H04W 74/0833*   (2024.01)
*H04W 68/00*     (2009.01)

(52) U.S. Cl.
CPC ..... *H04W 74/0841* (2013.01); *H04W 68/005* (2013.01)

(58) Field of Classification Search
None
See application file for complete search history.

(56) References Cited

U.S. PATENT DOCUMENTS 12,035,171 B2 *   7/2024   Jiang ................ H04W 28/08
2015/0181416 A1 * 6/2015   Dominguez Romero ...........
                                              H04W 76/16
                                              370/328
(Continued)

FOREIGN PATENT DOCUMENTS

CN   110784932 A  *  2/2020  ........... H04L 1/0003
CN   111050412 A  *  4/2020  ........... H04L 5/0053
(Continued)

OTHER PUBLICATIONS

International Search Report and Written Opinion issued in International Application No. PCT/EP2019/079718 dated Mar. 3, 2020 (12 pages).

(Continued)

*Primary Examiner* — Andrew C Oh
(74) *Attorney, Agent, or Firm* — Sonoda & Kobayashi Intellectual Property Law; Sarvajit S. Patil

(57) ABSTRACT

A technique for configuring a random access procedure to be performed by a user equipment, UE, (310) when handing over from a serving cell to a target cell in a cellular network is provided. A method implementation of the technique is performed by a base station (300) associated with the serving cell and comprises triggering sending, to the UE (310), a message related to the handover from the serving cell to the target cell, the message including an indication of a preferred type of random access procedure to be performed by the UE (310) with the target cell, wherein the preferred type of random access procedure corresponds to a two-step random access procedure.

20 Claims, 15 Drawing Sheets

(56) References Cited

U.S. PATENT DOCUMENTS

| | | | | |
|---|---|---|---|---|
| 2018/0110074 A1* | 4/2018 | Akkarakaran | | H04W 72/21 |
| 2018/0139778 A1* | 5/2018 | Chou | | H04W 76/27 |
| 2018/0205516 A1* | 7/2018 | Jung | | H04W 74/0836 |
| 2018/0279186 A1* | 9/2018 | Park | | H04W 36/302 |
| 2018/0279376 A1* | 9/2018 | Dinan | | H04W 52/50 |
| 2018/0310257 A1* | 10/2018 | Papasakellariou | | H04W 52/30 |
| 2018/0324869 A1* | 11/2018 | Phuyal | | H04W 76/10 |
| 2019/0132882 A1* | 5/2019 | Li | | H04L 27/2605 |
| 2019/0387551 A1* | 12/2019 | Liu | | H04W 74/0833 |

FOREIGN PATENT DOCUMENTS

| | | | | |
|---|---|---|---|---|
| CN | 110380837 B | * | 12/2020 | H04B 7/0695 |
| CN | 109392174 B | * | 2/2021 | H03M 13/271 |
| CN | 115209562 A | * | 10/2022 | H04W 74/0833 |
| EP | 1641299 A1 | * | 3/2006 | H04W 48/10 |
| EP | 2568758 A1 | * | 3/2013 | H04W 4/20 |
| EP | 3358901 A1 | * | 8/2018 | H04W 28/0268 |
| EP | 3528538 A1 | * | 8/2019 | H04W 36/0016 |
| EP | 3569029 B1 | * | 8/2021 | H04B 17/328 |
| EP | 3549384 B1 | * | 12/2021 | H04W 74/0833 |
| WO | WO-2015018044 A1 | * | 2/2015 | H04L 5/14 |
| WO | WO-2015120781 A1 | * | 8/2015 | H04W 74/004 |
| WO | WO-2018028436 A1 | * | 2/2018 | H04W 56/001 |
| WO | WO-2018085726 A1 | * | 5/2018 | |
| WO | WO-2018126418 A1 | * | 7/2018 | H04L 69/28 |
| WO | WO-2018127549 A1 | * | 7/2018 | H04W 74/0833 |
| WO | WO-2018131538 A1 | * | 7/2018 | H04W 74/04 |
| WO | WO-2018135631 A1 | * | 7/2018 | H04W 72/14 |
| WO | WO-2018135640 A1 | * | 7/2018 | H04L 5/0051 |
| WO | WO-2018137711 A1 | * | 8/2018 | H04W 72/04 |
| WO | WO-2018141202 A1 | * | 8/2018 | |
| WO | WO-2018151230 A1 | * | 8/2018 | H04W 52/22 |
| WO | WO-2018175809 A1 | * | 9/2018 | H04W 36/0077 |
| WO | WO-2018202064 A1 | * | 11/2018 | H04L 1/1812 |
| WO | WO-2018203724 A1 | * | 11/2018 | H04B 7/00 |
| WO | WO-2019032754 A1 | * | 2/2019 | H04B 17/318 |
| WO | WO-2019064768 A1 | * | 4/2019 | H04W 74/0833 |
| WO | WO-2019136718 A1 | * | 7/2019 | H04L 5/0053 |
| WO | WO-2020019230 A1 | * | 1/2020 | H04B 7/0626 |
| WO | WO-2020056721 A1 | * | 3/2020 | H04L 69/324 |
| WO | WO-2020056733 A1 | * | 3/2020 | H04W 24/02 |
| WO | WO-2020056736 A1 | * | 3/2020 | H04W 74/006 |
| WO | WO-2020056777 A1 | * | 3/2020 | H04L 25/0224 |

OTHER PUBLICATIONS

Qualcomm, "Open Issues on BWP", vol. Ran WG1, No. Reno, NV, USA; Nov. 27, 2017-Dec. 1, 2017, Nov. 18, 2017 (Nov. 18, 2017), 3GPP Draft; R1-1720693 (15 pages).

Sequans Communications, "Reduced RA for paged UEs", vol. Ran WG1, No. Vancouver, Canada; Jan. 22, 2018- Jan. 26, 2018, Jan. 12, 2018 (Jan. 12, 2018), 3GPP Draft; R1-1800226 (5 pages).

3GPP TS 38.321 V15.3.0, Sep. 2018, Technical Specification, 3rd Generation Partnership Project; Technical Specification Group Radio Access Network; NR; Medium Access Control (MAC) protocol specification (Release 15) (76 pages).

3GPP TS 38.331 V15.3.0, Sep. 2018, Technical Specification, 3rd Generation Partnership Project; Technical Specification Group Radio Access Network; NR; Radio Resource Control (RRC) protocol specification (Release 15) (445 pages).

* cited by examiner

```
ReconfigurationWithSync ::=     SEQUENCE {
    spCellConfigCommon          ServingCellConfigCommon
OPTIONAL, -- Need M
    newUE-Identity              RNTI-Value,
    t304                        ENUMERATED {ms50, ms100, ms150, ms200, ms500, ms1000, ms2000,
ms10000},
    rach-ConfigDedicated        CHOICE {
        uplink                  RACH-ConfigDedicated,
        supplementaryUplink     RACH-ConfigDedicated
}                                                                OPTIONAL, -- Need N
    ...,
    [[
    rach-Type,      ENUMERATED {4-step RA, 2-step RA}
    smtc                        SSB-MTC                          OPTIONAL, -- Need S
    ]]
}
```

Fig. 5

TECHNIQUE FOR CONFIGURING A RANDOM ACCESS PROCEDURE

CROSS REFERENCE TO RELATED APPLICATIONS

This application is a 35 U.S.C. § 371 National Stage of International Patent Application No. PCT/EP2019/079718, filed Oct. 30, 2019, designating the United States, which claims priority to International Patent Application No. PCT/CN2018/112577, filed Oct. 30, 2018. The above identified applications are incorporated by this reference.

TECHNICAL FIELD

The present disclosure generally relates to cellular networks. In particular, a technique for configuring a random access procedure to be performed by a user equipment (UE) when handing over from a serving cell to a target cell in a cellular network is presented. The technique may be embodied in methods, computer programs, apparatuses and systems.

BACKGROUND

The ordinary four-step random access procedure currently forms the standard random access procedure for legacy mobile communication systems, such as Long Term Evolution (LTE) systems, for example, and is also proposed as baseline for 5G New Radio (NR) systems. The basic principle of the four-step random access procedure is depicted in FIG. 1 in an exemplary LTE scenario. According to this procedure, the UE randomly selects and transmits a preamble to an eNodeB (eNB) in a first message. When the eNB detects the preamble, it estimates the timing alignment (TA) that the UE should use in order to obtain uplink (UL) synchronization at the eNB and responds, in a second message, with the TA and grant for the third message (Msg 3) of the procedure. In Msg 3, the UE transmits its identifier, and the eNB responds by acknowledging the UE identifier in a fourth message (Msg 4). Msg 4 provides content resolution, i.e., only one UE's identifier is sent even if several UEs have used the same preamble and Msg 3 simultaneously.

Further to the four-step random access procedure, a two-step random access procedure has been proposed in which the information conveyed with the UL messages (preamble and Msg 3) is sent simultaneously in a single message and, similarly, the information conveyed with the downlink (DL) messages (TA and Msg 4) is sent simultaneously in a single response. In the two-step random access procedure, the preamble and Msg 3 are thus transmitted in the same or in two subsequent subframes, so that both the preamble and Msg 3 face contention, wherein contention resolution in this case means that either both the preamble and Msg 3 are sent without collision or both collide. Upon successful reception of the preamble and Msg 3, the eNB responds with a TA and Msg 4 for contention resolution, wherein the TA and Msg 4 are again transmitted in the same or in two subsequent subframes. An exemplary illustration of the two-step random access procedure is shown in FIG. 2. To select among the four-step and two-step random access procedures if both procedures are configured for a cell, the UE may choose a preamble from one specific set of preambles if it wishes to perform a four-step random access procedure and from another set of preambles if it wishes to perform a two-step random access procedure. Preamble partitioning may thus be used to distinguish between four-step and two-step random access.

In the four-step procedure, one of the main purposes of the first two messages is to obtain UL timing alignment for the UE. In many situations, however, e.g., in small cells or in case of stationary UEs, this may not be needed since either a TA of zero (TA=0) will generally be sufficient (particularly in case of small cells) or a stored TA value from the last random access procedure may generally serve for the current random access as well (particularly in case of stationary UEs). In future radio networks, it can be expected that these situations are common, both due to dense deployments of small cells and a great number of stationary UEs, such as stationary Internet of Things (IoT) devices, for example.

Reducing the message exchange by using the two-step random access procedure may be beneficial in various use cases because it generally leads to reduced random access latency. The two-step random access procedure especially aims at reducing the latency that may be caused by too many listen before talk (LBT) operations required in four-step random access procedures. LBT is designed for unlicensed spectrum coexistence with other radio access technologies (RATs) in which a radio device applies a clear channel assessment (CCA) check before any transmission. On the other hand, there are also drawbacks of the two-step random access procedure compared to the four-step procedure. For example, as the network may need to add more physical random access channel (PRACH) preamble/resource partitions to distinguish between two-step random access and four-step random access, increased PRACH load, increased resource wastage and increased PRACH collision may be the consequence. Further, as the first message of the two-step random access procedure carries both a preamble-like signal as well as the payload, a base station must be able to decode both the preamble and the payload. However, it may be more difficult for the base station to successfully decode the payload portion especially when the UE has no well UL alignment when the random access is triggered.

These issues may also occur when performing handovers between cells. Handovers may be considered as special random access events that may support two-step random access procedures. The existing framework for handover procedures does not yet provide sufficient details to adequately support two-step random access procedures, however, and thus needs to be extended.

SUMMARY

Accordingly, there is a need for a technique that improves existing handover procedures to support two-step random access and that avoids one or more of the problems discussed above, or other problems.

According to a first aspect, a method for configuring a random access procedure to be performed by a UE when handing over from a serving cell to a target cell in a cellular network (e.g. in a New Radio, NR, cellular network) is provided. The method is performed by a base station associated with the serving cell and comprises triggering sending, to the UE, a message related to the handover from the serving cell to the target cell, the message including an indication of a preferred type of random access, RA, procedure to be performed by the UE with the target cell, wherein the preferred type of random access procedure corresponds to a two-step random access procedure.

The method performed by the UE may include an LBT operation, wherein the LBT operation may be performed prior to or in conjunction with the RA procedure. The base station may configure the UE with an information about a channel or a bandwidth part, BWP, that the UE shall attempt (first attempt and/or re-attempt after RA failure) for LBT and RA procedure, or with a rule on how to select a channel or a BWP for LBT and RA procedures in the target cell.

The two-step random access procedure may be selected among a plurality of types of random access procedures depending on one or more suitability criteria for the handover to be performed. The plurality of random access procedures may comprise the two-step random access procedure and a four-step random access procedure. The one or more suitability criteria may relate to at least one of one or more random access related capabilities of the UE, one or more random access related capabilities of a base station associated with the target cell, and one or more quality requirements related to a connection between the UE and the serving cell.

When the one or more suitability criteria relate to one or more random access related capabilities of the UE, the two-step random access procedure may be selected depending on whether the UE supports the two-step random access procedure. When the one or more suitability criteria relate to one or more random access related capabilities of the base station associated with the target cell, the two-step random access procedure may be selected depending on at least one of whether the base station associated with the target cell supports the two-step random access procedure, whether the base station associated with the target cell supports the two—may step random access procedure in a handover, and at least one of a load measurement and a channel occupancy measurement in the target cell. When the one or more suitability criteria relate to one or more quality requirements related to the connection between the UE and the serving cell, the two-step random access procedure may be selected depending on at least one of a quality of service (QoS) requirement of at least one ongoing service reliant on the connection between the UE and the serving cell, a remaining latency budget for the handover of the UE from the serving cell to the target cell, a radio quality measured for the connection between the UE and the serving cell, and a timing difference of the UE between the serving cell and the target cell.

The two-step random access procedure may be selected among the plurality of types of random access procedures by one of a selection made by the base station associated with the serving cell, a selection made by the base station associated with the target cell, and a combined selection made by both the base station associated with the serving cell and the base station associated with the target cell. The method may further comprise triggering coordinating the one or more suitability criteria with the base station associated with the target cell.

The message may include one or more parameters defining characteristics of the two-step random access procedure to be performed by the UE with the target cell. The one or more parameters may be obtained from the base station associated with the target cell. The one or more parameters may include at least one of a parameter indicating whether at least one of a preamble and a demodulation reference signal (DMRS) is to be included in a first message of the two-step random access procedure sent from the UE to the target cell, a parameter indicating which among a plurality of DMRSs configured by the cellular network is to be selected as the DMRS to be included in the first message, a parameter indicating enabling of fallback from the two-step random access procedure to a different type of random access procedure, a parameter indicating at least one of additional preambles and additional PRACH resources for use in the two-step random access procedure, a parameter indicating at least one resource for payload transmission in the first message, a parameter indicating enabling of early data transmission, a parameter relating to performing a LBT operation, and a parameter indicating at least one of a load measurement and a channel occupancy measurement in the target cell. The different type of random access procedure may correspond to a four-step random access procedure. When the two-step random access procedure corresponds to a contention free two-step random access procedure, the different type of random access procedure may also correspond to one of a contention based two-step random access procedure and a four-step random access procedure.

When at least one of plural channels and plural bandwidth parts (BWPs) are configured in the target cell, the one or more parameters may be provided per channel among the plural channels or per BWP among the plural BWPs, respectively. The one or more parameters may further include a rule for selection, by the UE, of one of the plural channels or one of the plural BWPs, respectively, for the two-step random access procedure and, optionally, for an LBT operation. The rule may include at least one of a definition of a preferred channel among the plural channels or a preferred BWP among the plural BWPs, respectively, to be first selected by the UE, a definition of one or more channels among the plural channels or one or more BWPs among the plural BWPs, respectively, to be selected by the UE if at least one of the two-step random access procedure and the LBT operation fails, a definition of a priority order among the plural channels or the plural BWPs, respectively, for selection by the UE, and at least one of a load status and a channel occupancy status of the plural channels or the plural BWPs, respectively, as basis for the selection by the UE. When the target cell is one of a plurality of target cells selectable by the UE for the handover to be performed, the one or more parameters may be provided per target cell of the plurality of target cells.

According to a second aspect, a method for configuring a random access procedure to be performed by a UE when handing over from a serving cell to a target cell in a cellular network is provided. The method is performed by the UE and comprises receiving, from a base station, a message related to the handover from the serving cell to the target cell, the message including an indication of a preferred type of random access procedure to be performed by the UE with the target cell, wherein the preferred type of random access procedure corresponds to a two-step random access procedure.

The method performed by the UE may include an LBT operation, wherein the LBT operation may be performed prior to or in conjunction with the RA procedure. The UE may be configured with an information about a channel or a bandwidth part, BWP, that the UE shall attempt (first attempt and/or re-attempt after RA failure) for LBT and RA procedure, or with a rule on how to select a channel or a BWP for LBT and RA procedures in the target cell. Such configuration information may be received from the base station.

The method according to the second aspect defines a method from a UE's perspective which may be complementary to the method according to the first aspect. As such, those aspects described with regard to the method of the first aspect which are applicable to the method of the second aspect may be comprised by the method of the second aspect as well, and vice versa.

The method may further comprise performing the handover from the serving cell to the target cell in accordance with the two-step random access procedure. The base station may be a base station associated with the serving cell. Also, the base station may be a base station associated with the target cell, wherein the message may correspond to a paging message received from the base station.

As in the method of the first aspect, the message may include one or more parameters defining characteristics of the two-step random access procedure to be performed by the UE with the target cell. The one or more parameters may include at least one of a parameter indicating whether at least one of a preamble and a DMRS is to be included in a first message of the two-step random access procedure sent from the UE to the target cell, a parameter indicating which among a plurality of DMRSs configured by the cellular network is to be selected as the DMRS to be included in the first message, a parameter indicating enabling of fallback from the two-step random access procedure to a different type of random access procedure, a parameter indicating at least one of additional preambles and additional PRACH resources for use in the two-step random access procedure, a parameter indicating at least one resource for payload transmission in the first message, a parameter indicating enabling of early data transmission, a parameter relating to performing a LBT operation, and a parameter indicating at least one of a load measurement and a channel occupancy measurement in the target cell. The different type of random access procedure may correspond to a four-step random access procedure. When the two-step random access procedure corresponds to a contention free two-step random access procedure, the different type of random access procedure may also correspond to one of a contention based two-step random access procedure and a four-step random access procedure.

When at least one of plural channels and plural BWPs are configured in the target cell, the one or more parameters may be provided per channel among the plural channels or per BWP among the plural BWPs, respectively. The one or more parameters may further include a rule for selection, by the UE, of one of the plural channels or one of the plural BWPs, respectively, for the two-step random access procedure and, optionally, for an LBT operation. The rule may include at least one of a definition of a preferred channel among the plural channels or a preferred BWP among the plural BWPs, respectively, to be first selected by the UE, a definition of a one or more channels among the plural channels or one or more BWPs among the plural BWPs, respectively, to be selected by the UE if at least one of the two-step random access procedure and the LBT operation fails, a definition of a priority order among the plural channels or the plural BWPs, respectively, for selection by the UE, and at least one of a load status and a channel occupancy status of the plural channels or the plural BWPs, respectively, as basis for the selection by the UE. When the target cell is one of a plurality of target cells selectable by the UE for the handover to be performed, the one or more parameters may be provided per target cell of the plurality of target cells.

According to a third aspect, a method for configuring a random access procedure to be performed by a UE when handing over from a serving cell to a target cell in a cellular network is provided. The method is performed by a base station associated with the target cell and comprises coordinating one or more suitability criteria with a base station associated with the serving cell, the one or more suitability criteria being used to select a two-step random access procedure among a plurality of types of random access procedures, wherein the two-step random access procedure corresponds to a preferred type of random access procedure to be performed by the UE with the target cell.

The method according to the third aspect defines a method from a by a base station associated with the target cell which may be complementary to either the method according to the first aspect or the method according to the second aspect. As such, those aspects described with regard to the methods of the first and second aspects which are applicable to the method of the third aspect may be comprised by the method of the third aspect as well, and vice versa.

As in the methods of at least one of the first and second aspects, the plurality of random access procedures may comprise the two-step random access procedure and a four-step random access procedure. The one or more suitability criteria relate to at least one of one or more random access related capabilities of the UE, one or more random access related capabilities of a base station associated with the target cell, and one or more quality requirements related to a connection between the UE and the serving cell.

When the one or more suitability criteria relate to one or more random access related capabilities of the UE, the two-step random access procedure may be selected depending on whether the UE supports the two-step random access procedure. When the one or more suitability criteria relate to one or more random access related capabilities of the base station associated with the target cell, the two-step random access procedure may be selected depending on at least one of whether the base station associated with the target cell supports the two-step random access procedure, whether the base station associated with the target cell supports the two-step random access procedure in a handover, and at least one of a load measurement and a channel occupancy measurement in the target cell. When the one or more suitability criteria relate to one or more quality requirements related to the connection between the UE and the serving cell, the two-step random access procedure may be selected depending on at least one of a QoS requirement of at least one ongoing service reliant on the connection between the UE and the serving cell, a remaining latency budget for the handover of the UE from the serving cell to the target cell, a radio quality measured for the connection between the UE and the serving cell, and a timing difference of the UE between the serving cell and the target cell. The two-step random access procedure may be selected among the plurality of types of random access procedures by one of a selection made by the base station associated with the serving cell, a selection made by the base station associated with the target cell, and a combined selection made by both the base station associated with the serving cell and the base station associated with the target cell.

The method may further comprise providing, to the base station associated with the serving cell, one or more parameters defining characteristics of the two-step random access procedure. The one or more parameters may include at least one of a parameter indicating whether at least one of a preamble and a DMRS is to be included in a first message of the two-step random access procedure sent from the UE to the target cell, a parameter indicating which among a plurality of DMRSs configured by the cellular network is to be selected as the DMRS to be included in the first message, a parameter indicating enabling of fallback from the two-step random access procedure to a different type of random access procedure, a parameter indicating at least one of additional preambles and additional PRACH resources for use in the two-step random access procedure, a parameter indicating at least one resource for payload transmission in the first message, a parameter indicating enabling of early data transmission, a parameter relating to performing a LBT operation, and a parameter indicating at least one of a load measurement and a channel occupancy measurement in the target cell. The different type of random access procedure may correspond to a four-step random access procedure. When the two-step random access procedure corresponds to a contention free two-step random access procedure, the different type of random access procedure may also correspond to one of a contention based two-step random access procedure and a four-step random access procedure.

When at least one of plural channels and plural BWPs are configured in the target cell, the one or more parameters may be provided per channel among the plural channels or per BWP among the plural BWPs, respectively. The one or more parameters may further include a rule for selection, by the UE, of one of the plural channels or one of the plural BWPs, respectively, for the two-step random access procedure and, optionally, for an LBT operation. The rule may include at least one of a definition of a preferred channel among the plural channels or a preferred BWP among the plural BWPs, respectively, to be first selected by the UE, a definition of one or more channels among the plural channels or one or more BWPs among the plural BWPs, respectively, to be selected by the UE if at least one of the two-step random access procedure and the LBT operation fails, a definition of a priority order among the plural channels or the plural BWPs, respectively, for selection by the UE, and at least one of a load status and a channel occupancy status of the plural channels or the plural BWPs, respectively, as basis for the selection by the UE.

When the serving cell is subject to an LBT failure, the method may further comprise triggering sending a paging message to the UE, the paging message including an indication of the preferred type of random access procedure to be performed by the UE with the target cell when handing over from the serving cell to the target cell, wherein the preferred type of random access procedure corresponds to the two-step random access procedure.

According to a fourth aspect, a computer program product is provided. The computer program product comprises program code portions for performing the method of at least one of the first, the second and the third aspect when the computer program product is executed on one or more computing devices (e.g., a processor or a distributed set of processors). The computer program product may be stored on a computer readable recording medium, such as a semiconductor memory, DVD, CD-ROM, and so on.

According to a fifth aspect, a base station associated with a serving cell for configuring a random access procedure to be performed by a UE when handing over from the serving cell to a target cell in a cellular network is provided. The base station comprises at least one processor and at least one memory, the at least one memory containing instructions executable by the at least one processor such that the base station is operable to perform any of the method steps presented herein with respect to the first aspect.

According to a sixth aspect, a UE for configuring a random access procedure to be performed by the UE when handing over from a serving cell to a target cell in a cellular network is provided. The UE comprises at least one processor and at least one memory, the at least one memory containing instructions executable by the at least one processor such that the UE is operable to perform any of the method steps presented herein with respect to the second aspect.

According to a seventh aspect, a base station associated with a target cell for configuring a random access procedure to be performed by a UE when handing over from a serving cell to the target cell in a cellular network is provided. The base station comprises at least one processor and at least one memory, the at least one memory containing instructions executable by the at least one processor such that the base station is operable to perform any of the method steps presented herein with respect to the third aspect.

According to an eighth aspect, there is provided a system comprising a base station of the fifth aspect, a UE of the sixth aspect and at least one base station of the seventh aspect.

BRIEF DESCRIPTION OF THE DRAWINGS

Implementations of the technique presented herein are described herein below with reference to the accompanying drawings, in which:

FIG. 5 illustrates an exemplary definition of an RRC "ReconfigurationWithSync" message;

DETAILED DESCRIPTION

In the following description, for purposes of explanation and not limitation, specific details are set forth in order to provide a thorough understanding of the present disclosure. It will be apparent to one skilled in the art that the present disclosure may be practiced in other embodiments that depart from these specific details.

Those skilled in the art will further appreciate that the steps, services and functions explained herein below may be implemented using individual hardware circuitry, using software functioning in conjunction with a programmed microprocessor or general purpose computer, using one or more Application Specific Integrated Circuits (ASICs) and/or using one or more Digital Signal Processors (DSPs). It will also be appreciated that when the present disclosure is described in terms of a method, it may also be embodied in one or more processors and one or more memories coupled to the one or more processors, wherein the one or more memories are encoded with one or more programs that perform the steps, services and functions disclosed herein when executed by the one or more processors.

Figure 1:
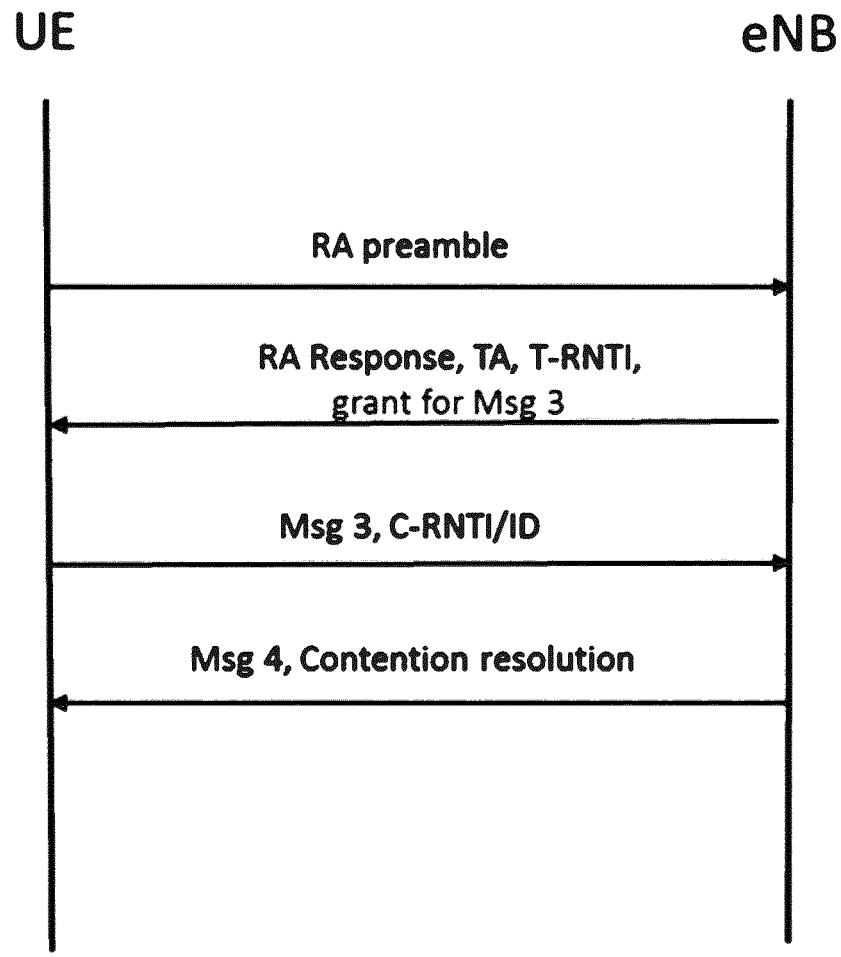
FIG. 1 illustrates an exemplary four-step random access procedure.
Figure 2:
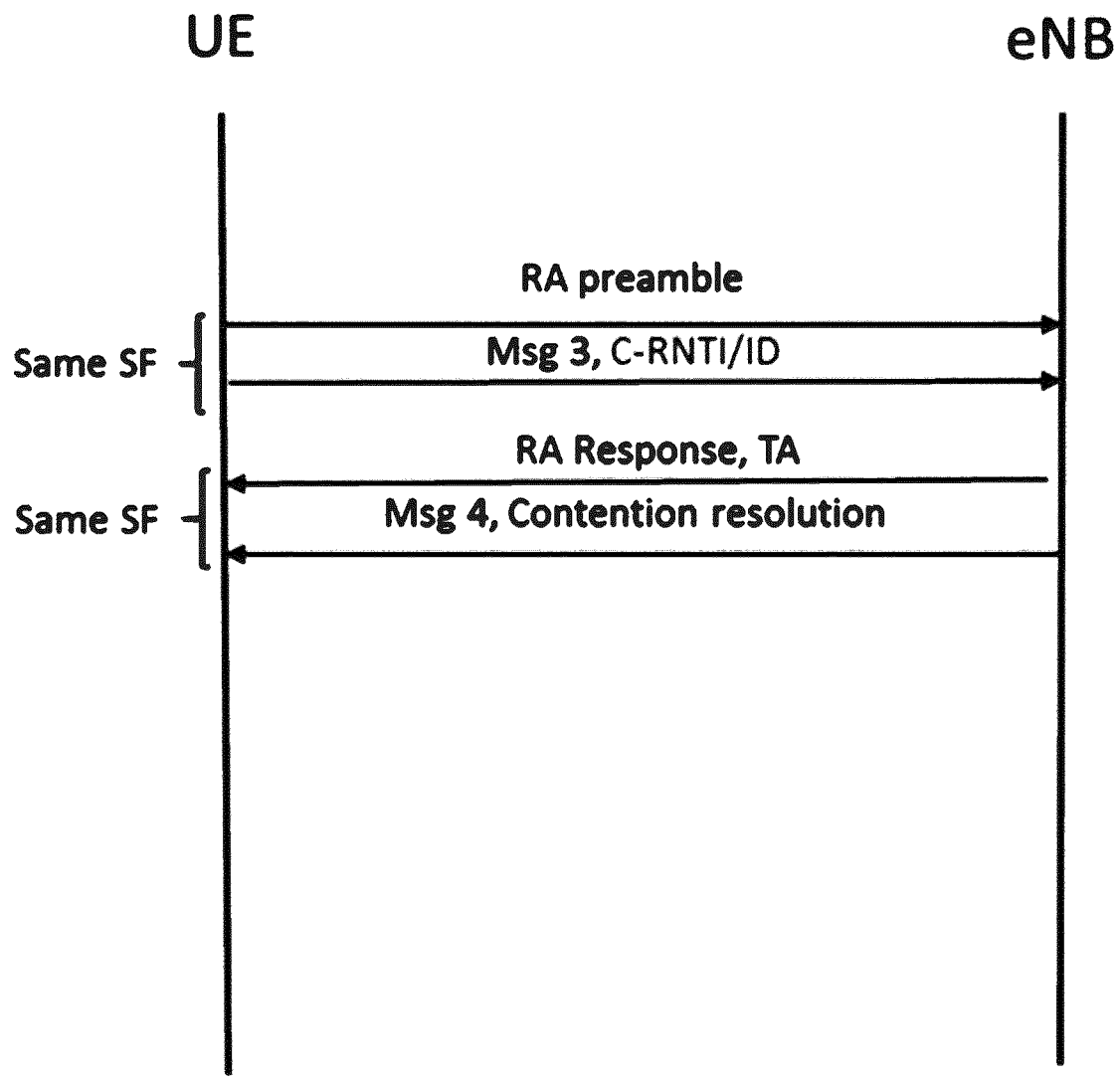
FIG. 2 illustrates an exemplary two-step random access procedure.
Figure 3:
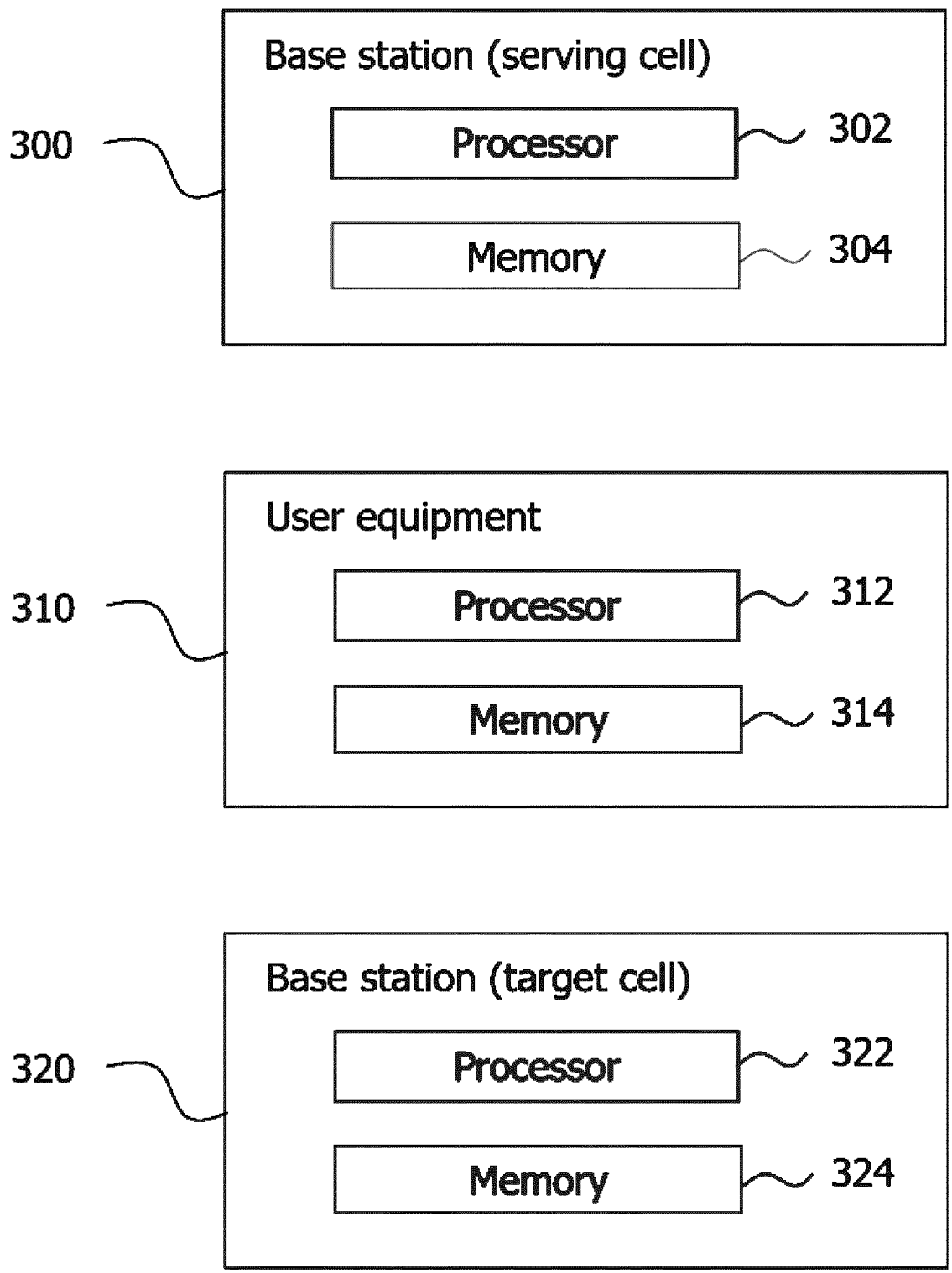
FIGS. 3a to 3c illustrate exemplary compositions of a base station associated with a serving cell, a UE, and a base station associated with a target cell according to the present disclosure.
Figure 3A:
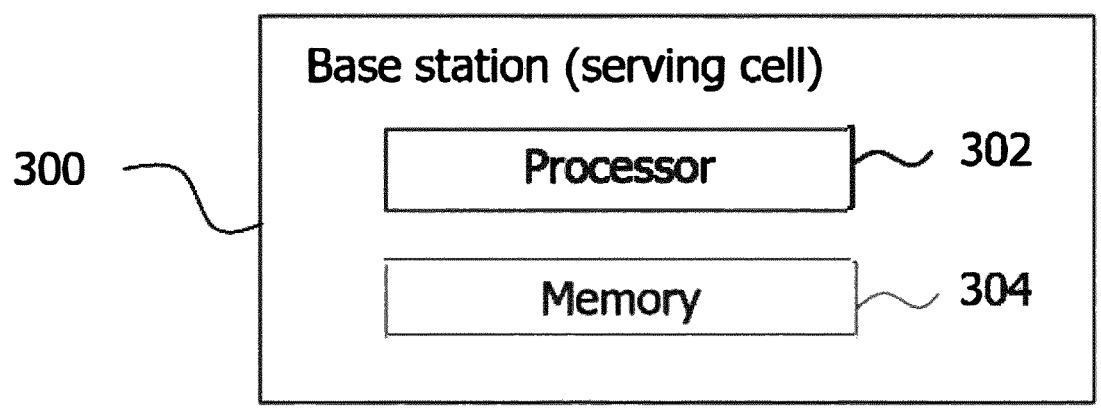

FIG. 3a schematically illustrates an exemplary composition of a base station 300 associated with a serving cell (in the following denoted as "serving base station") for configuring a random access procedure to be performed by a UE when handing over from the serving cell to a target cell in a cellular network. The serving base station 300 comprises at least one processor 302 and at least one memory 304, wherein the at least one memory 304 contains instructions executable by the at least one processor 302 such that the serving base station 300 is operable to carry out the method steps described herein below with reference to the serving base station.

Figure 3B:
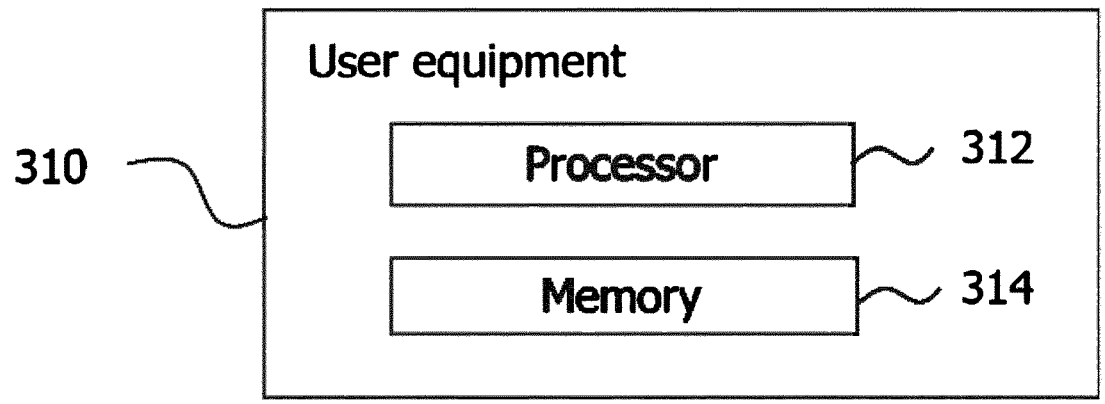

FIG. 3b schematically illustrates an exemplary composition of a UE 310 for configuring a random access procedure to be performed when handing over from a serving cell to a target cell in a cellular network. The UE 310 comprises at least one processor 312 and at least one memory 314, wherein the at least one memory 314 contains instructions executable by the at least one processor 312 such that the UE 310 is operable to carry out the method steps described herein below with reference to the UE.

Figure 3C:
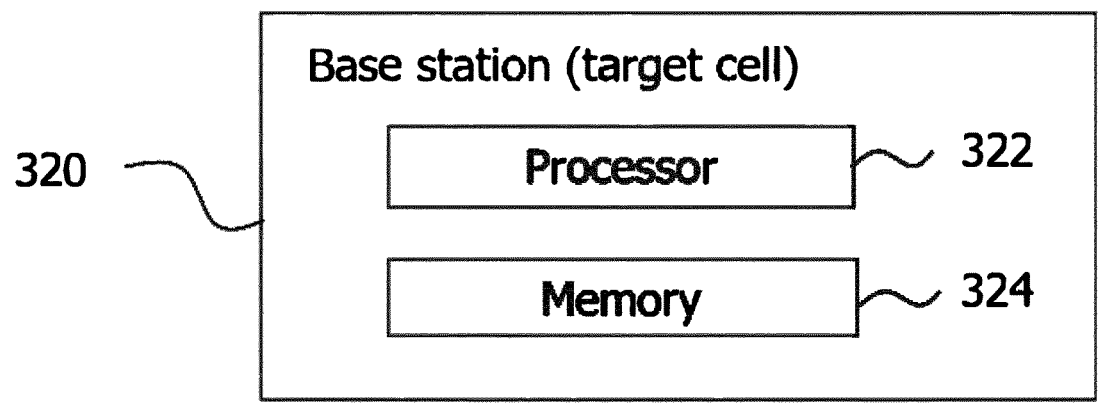

FIG. 3c schematically illustrates an exemplary composition of a base station 320 associated with a target cell (in the following denoted as "target base station") for configuring a random access procedure to be performed by a UE when handing over from a serving cell to the target cell in a cellular network. The target base station 320 comprises at least one processor 322 and at least one memory 324, wherein the at least one memory 324 contains instructions executable by the at least one processor 322 such that the target base station 320 is operable to carry out the method steps described herein below with reference to the target base station.

It will be understood that each of the serving base station 300 and the target base station 320 may be implemented on a physical computing unit or a virtualized computing unit, such as a virtual machine, for example. It will further be appreciated that each of the serving base station 300 and the target base station 320 may not necessarily be implemented on a standalone computing unit, but may be implemented as components—realized in software and/or hardware—residing on multiple distributed computing units as well, such as in a cloud computing environment, for example.

Figure 4:
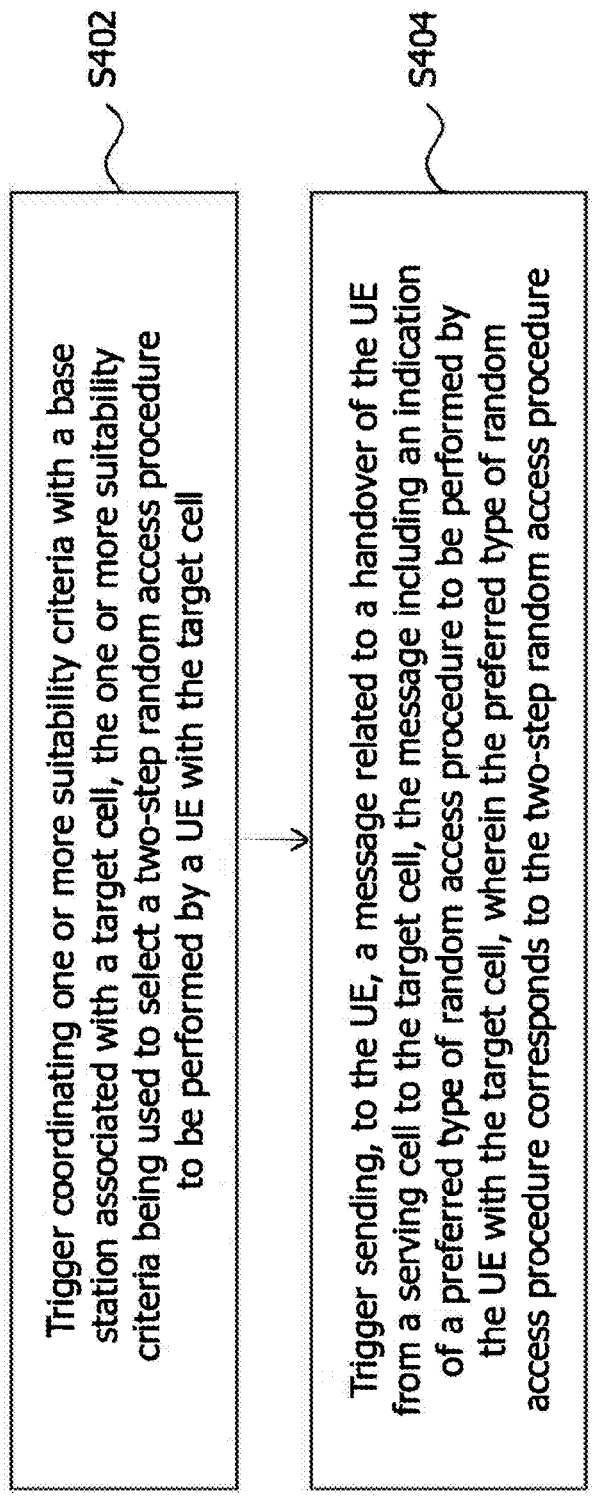
FIG. 4 illustrates a method which may be performed by the base station associated with the serving cell according to the present disclosure.

FIG. 4 illustrates a method which may be performed by the serving base station 300 according to the present disclosure. The method is dedicated to configuring a random access procedure to be performed by a UE (e.g., UE 310) when handing over from the serving cell to a target cell in a cellular network. In an optional step S402, the serving base station 300 may trigger coordinating one or more suitability criteria with a base station associated with a target cell (e.g., target base station 320), wherein the one or more suitability criteria may be used to select a two-step random access procedure to be performed by the UE when handing over from the serving cell to the target cell. In step S404, the serving base station 300 may trigger sending, to the UE, a message related to the handover from the serving cell to the target cell, the message including an indication of a preferred type of random access procedure to be performed by the UE with the target cell, wherein the preferred type of random access procedure corresponds to the two-step random access procedure.

The random access procedure may be performed by the UE in order to gain initial access to the cellular network through the target cell when performing the handover from the serving cell to the target cell. The serving cell may correspond to a cell via which the UE is connected to the cellular network before performing the handover and the target cell may correspond to a cell via which the UE is connected to the cellular network after performing the handover. The serving base station 300 may be responsible for the serving cell and the target base station (e.g., target base station 320) may be responsible for the target cell. The serving base station 300 and the target base station may be different and may communicate with each other via a respective interface of the cellular network, e.g., in order to perform handover related signaling as needed. It will be understood that the serving base station 300 and that target base station may also coincide when the serving cell and the target cell are provided by the same base station.

The cellular network may comprise an NR system and, in particular, an NR unlicensed spectrum (NR-U) system in which LBT operations may frequently occur in the four-step random access procedure. It will be understood, however, that the technique presented herein is not limited to NR-U scenarios and may also be applied in other unlicensed operation scenarios, such as in LTE license assisted access (LAA) or enhanced license assisted access (eLAA) systems, as well as in licensed scenarios, such as in LTE licensed or NR licensed systems, for example.

In order to request the UE to perform the handover in accordance with the preferred type of random access procedure, the serving base station 300 may trigger, in step S404, sending the message related to the handover to the UE, wherein the message includes an indication of the preferred type of random access procedure to be performed by the UE with the target cell. More specifically, the message may include an indication of a plurality of types of random access procedures, e.g., a two-step random access procedure and a four-step random access procedure, wherein the two-step random access procedure may be indicated as the preferred type of random access procedure, whereas the four-step random access procedure may be indicated as a fallback type of random access procedure for the case that the two-step random access procedure cannot be carried out between the UE with the target cell. In another variant, the message may include an indication of the preferred type of random access procedure only, in which case fallback types of random access procedures, e.g., a four-step random access procedure, may be taken as implicit or may be preconfigured as fallback types in the UE, for example.

The message related to the handover may be a handover command sent from the serving base station 300 to the UE, for example. In particular, the message related to the handover may be a radio resource control (RRC) signaling message. In NR licensed systems, the message related to the handover may be carried by (or be included in) an RRC "ReconfigurationWithSync" message, for example. An exemplary definition of such message is depicted in FIG. 5, where the preferred type of random access procedure may be selected among the entries of the random access channel (RACH) type ("rach-Type") enumeration that comprises a four-step random access procedure ("4-step RA") and a two-step random access procedure ("2-step RA"). Upon receiving the message related to the handover, the UE may initiate the handover in accordance with the requested random access procedure and the UE's capability.

By providing information on the preferred type of random access procedure from the serving base station 300 to the UE, the serving base station 300 may be able to configure a suitable random access procedure for the handover depending on the situation or circumstances. To this end, the two-step random access procedure may be selected among a plurality of types of random access procedures depending on one or more suitability criteria for the handover to be performed (i.e., in a situation-specific manner). As said, the plurality of random access procedures may comprise the two-step random access procedure and a four-step random access procedure, for example. In particular, the one or more suitability criteria may relate to at least one of one or more random access related capabilities of the UE, one or more random access related capabilities of the target base station, and one or more quality requirements related to a connection between the UE and the serving cell.

For example, a decision on using the two-step random access procedure may be made based on a UE capability regarding random access types. Thus, when the one or more suitability criteria relate to one or more random access related capabilities of the UE, the two-step random access procedure may be selected depending on whether the UE supports the two-step random access procedure, for example.

Alternatively or additionally, the decision on using the two-step random access procedure may be made in coordination with the target base station considering capabilities of the target base station. Thus, when the one or more suitability criteria relate to one or more random access related capabilities of the target base station, the two-step random access procedure may be selected depending on at least one of whether the target base station supports the two-step random access procedure, whether the base station associated with the target cell supports the two-step random access procedure in a handover, and at least one of a load measurement and a channel occupancy measurement in the target cell. For example, the two-step random access procedure may be selected if at least one of a load and a channel occupancy in the target cell is below a predetermined threshold.

Still alternatively or additionally, the decision on using the two-step random access procedure may be made in consideration of quality requirements known to the serving base station 300. Thus, when the one or more suitability criteria relate to one or more quality requirements related to a connection between the UE and the serving cell, the two-step random access procedure may be selected depending on at least one of a QoS requirement of at least one ongoing service reliant on the connection between the UE and the serving cell (e.g., the two-step random access procedure may be selected if the service has a critical latency requirement), a remaining latency budget for the handover of the UE from the serving cell to the target cell (e.g., the two-step random access procedure may be selected if the latency budget left for the handover procedure is below a predetermined threshold), a radio quality measured for the connection between the UE and the serving cell (e.g., the two-step random access procedure may be selected if the measured radio quality, such as a reference signal received power (RSRP), a reference signal received quality (RSRQ) and/or a signal to interference plus noise ratio (SINR), is above a predetermined threshold), and a timing difference of the UE between the serving cell and the target cell (e.g., the two-step random access procedure may be selected depending on whether or not the target cell can use a similar UL timing alignment as the serving cell).

The decision on using the two-step random access procedure for the handover to be performed may be made by the serving base station 300, the target base station or by both the base stations together. The two-step random access procedure may thus be selected among the plurality of types of random access procedures by one of a selection made by the serving base station 300, a selection made by the target base station, and a combined selection made by both the serving base station and the target base station. In case of a combined selection, the serving base station 300 may request the two-step random access procedure in a handover request sent to the target base station and the target base station may override this decision in a handover request acknowledgment message sent back to the serving base station 300, for example.

As said, the decision on using the two-step random access procedure may be made in coordination with the target base station. The serving base station 300 may thus trigger coordinating, in step S402, i.e., prior to triggering sending the message related to the handover to the UE, the one or more suitability criteria with the target base station. Coordinating the one or more suitability criteria may include exchanging coordination messages between the serving base station 300 and the target base station as needed, such as sending a coordination request from the serving base station 300 to the target base station and sending a coordination response from the target base station to the serving base station 300. For the coordination messages, existing signaling messages may be reused. For example, a handover request sent from the serving base station 300 to the target base station as part of the handover related signaling may be reused for the coordination request and a handover request acknowledgment message sent from the target base station to the serving base station 300 may be reused for the coordination response.

In order to provide further information to the UE on how the preferred random access procedure is to be performed, the message sent to the UE may include one or more parameters defining characteristics of the two-step random access procedure to be performed by the UE with the target cell. The one or more parameters may be obtained from the target base station. For example, the target base station may provide these parameters as part of the exchange of coordination messages with the serving base station 300, such as in the coordination response mentioned above.

The one or more parameters included in the message may comprise at least one of a parameter indicating whether at least one of a preamble and a DMRS is to be included in a first message of the two-step random access procedure sent from the UE to the target cell (it will be understood that also other types of UE identifiers instead of, or in addition to, the preamble and the DMRS may be carried in the first message), a parameter indicating which among the plurality of DMRSs configured by the cellular network is to be selected as the DMRS to be included in the first message (e.g., in order to improve collision resolution, the UE may select one DMRS from multiple DMRS series configured by the network to avoid that several UEs may use the same DMRS if contention based random access (CBRA) is applied for the handover), a parameter indicating enabling of fallback from the two-step random access procedure to a different type of random access procedure (it will be understood that such fallback may also be implicit to, or preconfigured in, the UE), a parameter indicating at least one of additional preambles and additional PRACH resources for use in the two-step random procedure (e.g., additional preambles and/or PRACH resources may be included in order to provide more random access opportunities), a parameter indicating at least one resource for payload transmission in the first message (e.g., resources in frequency and/or time domain, hybrid automatic repeat request (HARQ) process IDs, power allocation, modulation and coding scheme (MCS) options, etc., e.g., assuming that it may be beneficial to support link adaptation for the first message, if possible), a parameter indicating enabling of early data transmission (e.g., allowing data transmission already during the random access procedure), a parameter relating to performing an LBT operation (e.g., indicating whether or not an LBT operation shall be performed prior to the random access procedure, or indicating a channel access priority class relating to the LBT operation), and a parameter indicating at least one of a load measurement and a channel occupancy measurement in the target cell. The different type of random access procedure mentioned above may correspond to a four-step random access procedure, for example. When the two-step random access procedure corresponds to a contention free two-step random access procedure, the different type of random access procedure may also correspond to one of a contention based two-step random access procedure and a four-step random access procedure, for example.

The above parameters may be configured per channel or per BWP if there are multiple channels or BWPs configured in the target cell, e.g., if multiple random access opportunities across channels or BWPs are provided by an RRC signaling message. Thus, when at least one of plural channels and plural BWPs are configured in the target cell, the one or more parameters may be provided per channel among the plural channels or per BWP among the plural BWPs, respectively. The one or more parameters may further include a rule for selection, by the UE, one of the plural channels or one of the plural BWPs, respectively, for the two-step random access procedure and, optionally, for an LBT operation. The rule may include at least one of a definition of a preferred channel among the plural channels or a preferred BWP among the plural BWPs, respectively, to be first selected by the UE (e.g., defining which channel or BWP the UE shall first attempt for an LBT or a random access procedure), a definition of one or more channels among the plural channels or one or more BWPs among the plural BWPs, respectively, to be selected by the UE if at least one of the two-step random access procedure and the LBT operation fails (e.g., defining which channels or BWPs the UE shall re-attempt if the LBT operation or the random access transmission fails on the first channel or BWP), a definition of a priority order among the plural channels or the plural BWPs, respectively, for selection by the UE, and at least one of a load status and a channel occupancy status of the plural channels or the plural BWPs, respectively, as basis for the selection by the UE. When the target cell is one of a plurality of target cells selectable by the UE for the handover to be performed, the one or more parameters may be provided per target cell of the plurality of target cells. The serving base station 300 may for this purpose indicate the plurality of target cells for selection by the UE in an RRC message sent to the UE, for example.

Figure 6A:
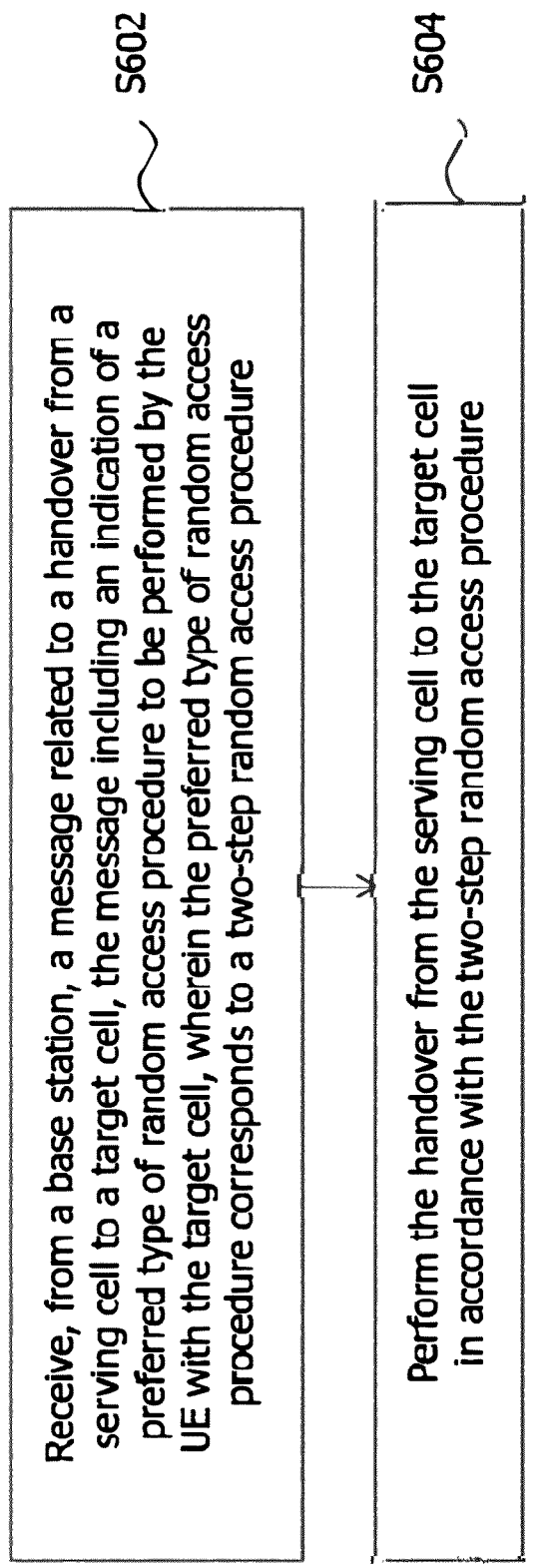
FIG. 6a illustrates a method which may be performed by the UE according to the present disclosure.

FIG. 6*a* illustrates a method which may be performed by the UE 310 according to the present disclosure. The method is dedicated to configuring a random access procedure to be performed by the UE 310 when handing over from the serving cell to a target cell in a cellular network. The operation of the UE 310 may be complementary to the operation of the serving base station 300 described above in relation to FIG. 4 and, as such, aspects described above with regard to the operation of the UE may be applicable to the operation of the UE 310 described in the following as well. Unnecessary repetitions are thus omitted in the following.

In step S602, the UE 310 may receive, from a base station, a message related to the handover from the serving cell to the target cell, the message including an indication of a preferred type of random access procedure to be performed by the UE 310 with the target cell, wherein the preferred type of random access procedure corresponds to a two-step random access procedure. In step S604, the UE 310 may perform the handover from the serving cell to the target cell in accordance with the two-step random access procedure.

In one variant, the base station may be a serving base station (e.g., serving base station 300). This variant may correspond to the scenario described above in relation to FIG. 4 in which the serving base station sends the message related to the handover to the UE 310. In another variant, the message related to the handover may be sent from a target base station to the UE. This may be the case when a handover command is provided via the target base station if the serving cell is subject to an LBT failure, for example. In such a case, the target base station may send a paging message to the UE, wherein the paging message may be reused for the message related to the handover (i.e., the paging message may correspond to the message related to the handover, or may convey the information described herein with regard to the message related to the handover). The base station may thus be a target base station, wherein the message related to the handover may correspond to a paging message received from the base station. In one such variant, the paging message may carry a handover command including the indication of the preferred type of random access procedure and, when the UE receives the handover command via the paging message, the UE may trigger the requested random access procedure to complete the handover procedure to the target cell. In another variant, the paging message may not carry an actual handover command, but rather an indication that the paging is for handover purposes, including the indication of the preferred type of random access procedure. The actual handover command may then be received by the UE after initiating the requested random access procedure with the target cell.

As described above in relation to FIG. 4, the message related to the handover may include one or more parameters defining characteristics of the two-step random access procedure to be performed by the UE 310 with the target cell. The one or more parameters may include at least one of a parameter indicating whether at least one of a preamble and a DMRS is to be included in a first message of the two-step random access procedure sent from the UE 310 to the target cell, a parameter indicating which among a plurality of DMRSs configured by the cellular network is to be selected as the DMRS to be included in the first message, a parameter indicating enabling of fallback from the two-step random access procedure to a different type of random access procedure, a parameter indicating at least one of additional preambles and additional PRACH resources for use in the two-step random access procedure, a parameter indicating at least one resource for payload transmission in the first message, a parameter indicating enabling of early data transmission, a parameter relating to performing a LBT operation, and a parameter indicating at least one of a load measurement and a channel occupancy measurement in the target cell. The different type of random access procedure may correspond to a four-step random access procedure. When the two-step random access procedure corresponds to a contention free two-step random access procedure, the different type of random access procedure may also correspond to one of a contention based two-step random access procedure and a four-step random access procedure.

When at least one of plural channels and plural BWPs are configured in the target cell, the one or more parameters may be provided per channel among the plural channels or per BWP among the plural BWPs, respectively. The one or more parameters may further include a rule for selection, by the UE 310, of one of the plural channels or one of the plural BWPs, respectively, for the two-step random access procedure and, optionally, for an LBT operation. The rule may include at least one of a definition of a preferred channel among the plural channels or a preferred BWP among the plural BWPs, respectively, to be first selected by the UE 310, a definition of one or more channels among the plural channels or one or more BWPs among the plural BWPs, respectively, to be selected by the UE 310 if at least one of the two-step random access procedure and the LBT operation fails, a definition of a priority order among the plural channels or the plural BWPs, respectively, for selection by the UE 310, and at least one of a load status and a channel occupancy status of the plural channels or the plural BWPs, respectively, as basis for the selection by the UE 310. When the target cell is one of a plurality of target cells selectable by the UE 310 for the handover to be performed, the one or more parameters may be provided per target cell of the plurality of target cells.

Figure 6B:
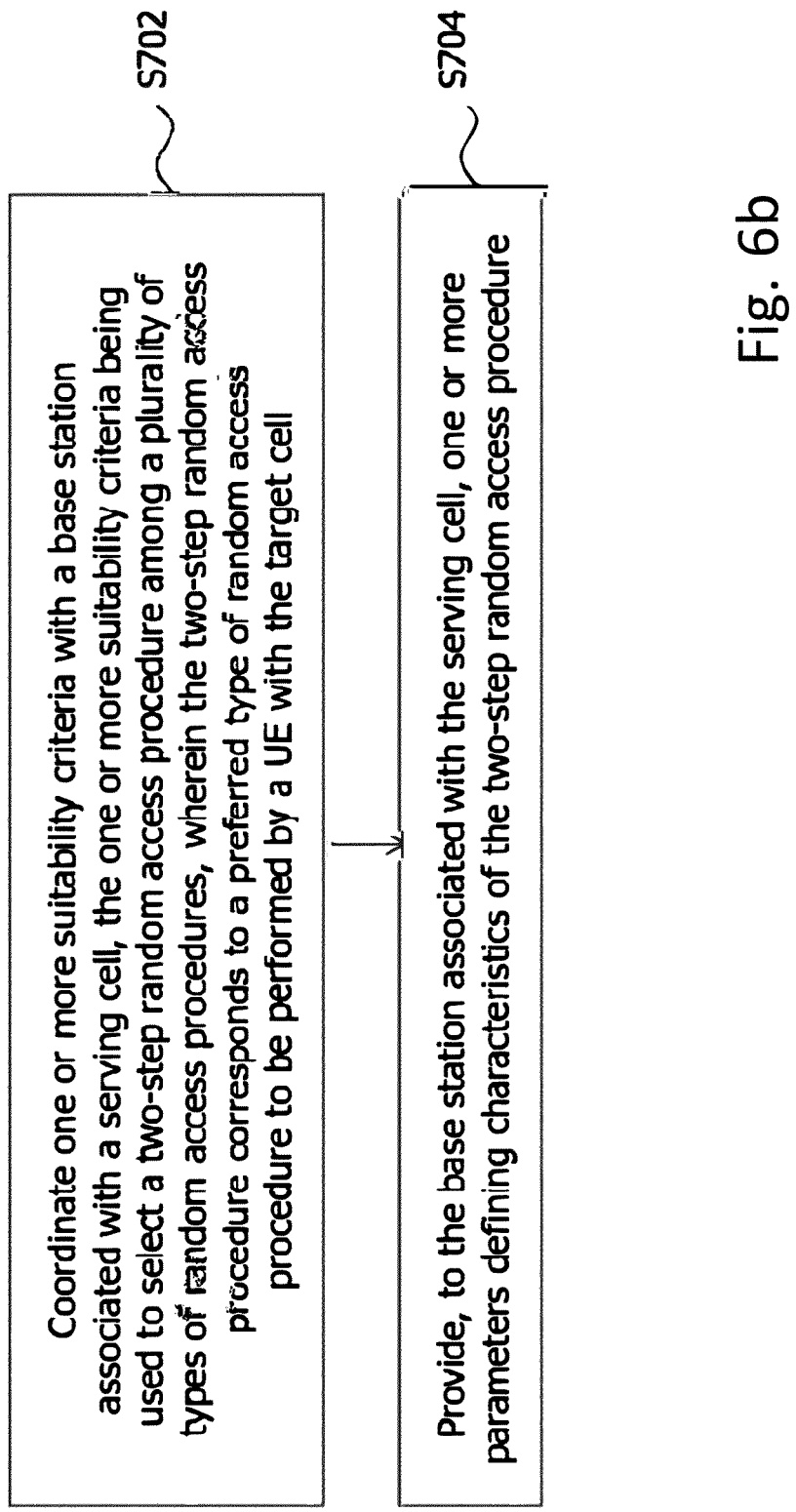
FIG. 6b illustrates a method which may be performed by the base station associated with the target cell according to the present disclosure.
Figure 7:
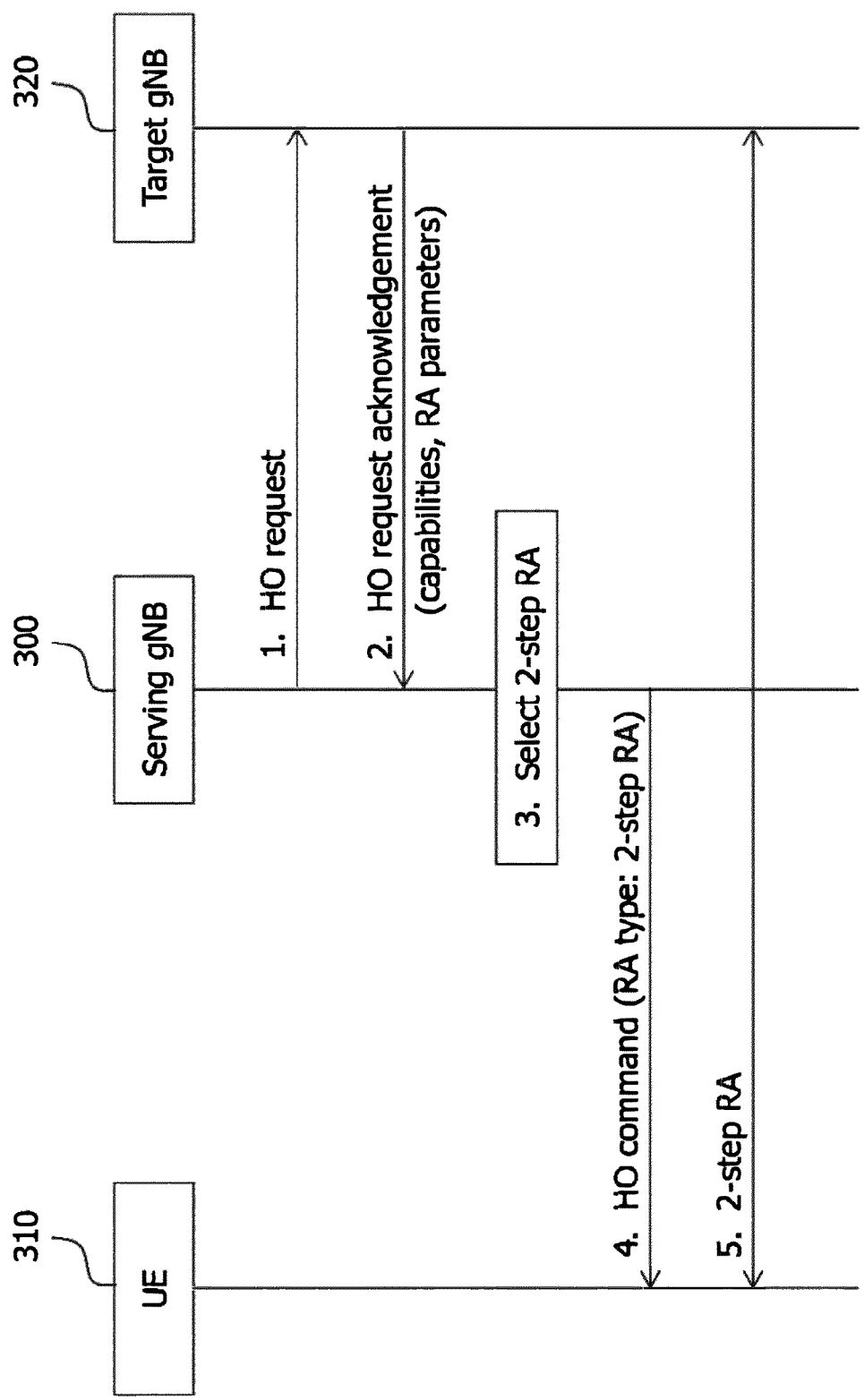
FIG. 7 illustrates a signaling diagram of an exemplary interaction between the base station associated with the serving cell, the base station associated with the target cell and the UE according to the present disclosure.

FIG. 6b illustrates a method which may be performed by the target base station 320 according to the present disclosure. The method is dedicated to configuring a random access procedure to be performed by a UE (e.g., UE 310) when handing over from the serving cell to a target cell in a cellular network. The operation of the target base station 320 may be complementary to the operation of the serving base station 300 described above in relation to FIG. 4 and/or the operation of the UE 310 described above in relation to FIG. 6a and, as such, aspects described above with regard to the operation of the target base station may be applicable to the operation of the target base station 320 described in the following as well. Unnecessary repetitions are thus omitted in the following.

In step S702, the target base station 320 may coordinate one or more suitability criteria with a serving base station (e.g., serving base station 300), wherein the one or more suitability criteria may be used to select a two-step random access procedure among a plurality of types of random access procedures, wherein the two-step random access procedure corresponds to a preferred type of random access procedure to be performed by the UE (e.g., UE 310) with the target cell.

As described above in relation to FIGS. 4 and 6, the plurality of random access procedures may comprise the two-step random access procedure and a four-step random access procedure. The one or more suitability criteria relate to at least one of one or more random access related capabilities of the UE, one or more random access related capabilities of a base station associated with the target cell, and one or more quality requirements related to a connection between the UE and the serving cell.

When the one or more suitability criteria relate to one or more random access related capabilities of the UE, the two-step random access procedure may be selected depending on whether the UE supports the two-step random access procedure. When the one or more suitability criteria relate to one or more random access related capabilities of the base station associated with the target cell, the two-step random access procedure may be selected depending on at least one of whether the base station associated with the target cell supports the two-step random access procedure, whether the base station associated with the target cell supports the two-step random access procedure in a handover, and at least one of a load measurement and a channel occupancy measurement in the target cell. When the one or more suitability criteria relate to one or more quality requirements related to the connection between the UE and the serving cell, the two-step random access procedure may be selected depending on at least one of a QoS requirement of at least one ongoing service reliant on the connection between the UE and the serving cell, a remaining latency budget for the handover of the UE from the serving cell to the target cell, a radio quality measured for the connection between the UE and the serving cell, and a timing difference of the UE between the serving cell and the target cell. The two-step random access procedure may be selected among the plurality of types of random access procedures by one of a selection made by the base station associated with the serving cell, a selection made by the base station associated with the target cell, and a combined selection made by both the base station associated with the serving cell and the base station associated with the target cell.

In step S704, the target base station 320 may provide, to the serving base station, one or more parameters defining characteristics of the two-step random access procedure. The one or more parameters may include at least one of a parameter indicating whether at least one of a preamble and a DMRS is to be included in a first message of the two-step random access procedure sent from the UE to the target cell, a parameter indicating which among a plurality of DMRSs configured by the cellular network is to be selected as the DMRS to be included in the first message, a parameter indicating enabling of fallback from the two-step random access procedure to a different type of random access procedure, a parameter indicating at least one of additional preambles and additional PRACH resources for use in the two-step random access procedure, a parameter indicating at least one resource for payload transmission in the first message, a parameter indicating enabling of early data transmission, a parameter relating to performing a LBT operation, and a parameter indicating at least one of a load measurement and a channel occupancy measurement in the target cell. The different type of random access procedure may correspond to a four-step random access procedure. When the two-step random access procedure corresponds to a contention free two-step random access procedure, the different type of random access procedure may also correspond to one of a contention based two-step random access procedure and a four-step random access procedure.

When at least one of plural channels and plural BWPs are configured in the target cell, the one or more parameters may be provided per channel among the plural channels or per BWP among the plural BWPs, respectively. The one or more parameters may further include a rule for selection, by the UE, of one of the plural channels or one of the plural BWPs, respectively, for the two-step random access procedure and, optionally, for an LBT operation. The rule may include at least one of a definition of a preferred channel among the plural channels or a preferred BWP among the plural BWPs, respectively, to be first selected by the UE, a definition of one or more channels among the plural channels or one or more BWPs among the plural BWPs, respectively, to be selected by the UE if at least one of the two-step random access procedure and the LBT operation fails, a definition of a priority order among the plural channels or the plural BWPs, respectively, for selection by the UE, and at least one of a load status and a channel occupancy status of the plural channels or the plural BWPs, respectively, as basis for the selection by the UE.

As described above in relation to FIG. 6a, the message related to the handover may in one variant be sent from the target base station 320 to the UE, e.g., in case a handover command is provided via the target base station 320 if the serving cell is subject to an LBT failure. Thus, when the serving cell is subject to an LBT failure, the method may further comprise triggering sending a paging message to the UE, the paging message including an indication of the preferred type of random access procedure to be performed by the UE with the target cell when handing over from the serving cell to the target cell, wherein the preferred type of random access procedure corresponds to the two-step random access procedure. The paging message may take one of the forms described above in relation to FIG. 6a.

FIG. 6b illustrates a signaling diagram of an exemplary interaction between the serving base station 300, the target base station 320 and the UE 310 in accordance with the technique presented above. In the shown example, the cellular network corresponds to a 5G NR system in which both the serving base station 300 and the target base station 320 are provided as next generation NodeBs (gNBs). In order to trigger the handover procedure and to coordinate with the target base station 300 regarding the preferred type of random access procedure, the serving base station 300 may send, in step 1, a handover request to the target base station 320. In step 2, the target base station 320 may respond with a handover request acknowledgment message which may be reused as coordination response to convey, to the serving base station 300, information on the random access related capabilities of the target base station 320 as well as on the parameters defining characteristics of the two-step random access procedure to be performed by the UE 310 with the target base station 320. Based on this information, and optionally based on random access related capabilities of the UE 310 and quality requirements related to a connection between the UE 310 and the serving cell known to the serving base station 300, the serving base station 300 may select, in step 3, the two-step random access procedure as the most suitable random access procedure among a plurality of types of random access procedures (e.g., the two-step random access procedure and a four-step random access procedure), in other words, as the preferred random access procedure that may be most suitable for the current situation, in particular considering the UE capabilities, the target base station capabilities and the connection quality requirements, for example. In step 4, the serving base station 300 may send a handover command (e.g., using RRC signaling) to the UE 310, wherein the handover command may include the indication of the preferred type of random access procedure, i.e., the two-step random access procedure. Upon receiving the handover command, the UE 310 may perform, in step 5, the two-step random access procedure with the target base station 320 in accordance with the two-step random access procedure.

Figure 8:
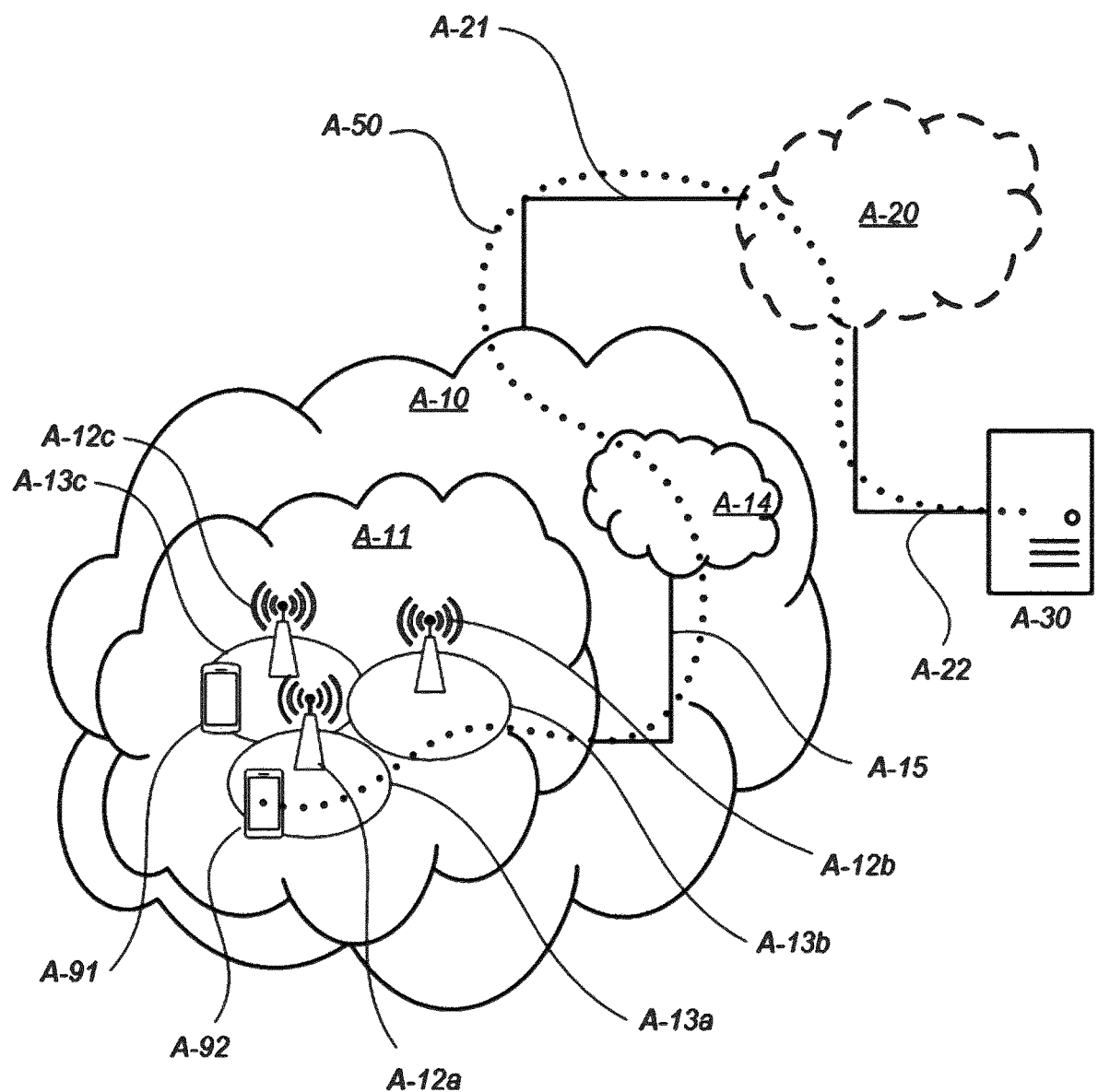
FIG. 8 schematically illustrates a telecommunication network connected via an intermediate network to a host computer.

FIG. 8 schematically illustrates a telecommunication network connected via an intermediate network to a host computer. With reference to FIG. 8, in accordance with an embodiment, a communication system includes a telecommunication network A-10, such as a 3GPP-type cellular network, which comprises an access network A-11, such as a radio access network, and a core network A-14. The access network A-11 comprises a plurality of base stations A-12a, A-12b, A-12c, such as NBs, eNBs, gNBs or other types of wireless access points, each defining a corresponding coverage area A-13a, A-13b, A-13c. In an aspect, any of base stations A-12a, A-12b, A-12c, or any other base stations described herein may be considered to be a network node, for instance, if such as network node is described above in the present Application. Each base station A-12a, A-12b, A-12c is connectable to the core network A-14 over a wired or wireless connection A-15. A first user equipment (UE) A-91 located in coverage area A-13c is configured to wirelessly connect to, or be paged by, the corresponding base station A-12c. A second UE A-92 in coverage area A-13a is wirelessly connectable to the corresponding base station A-12a. While a plurality of UEs A-91, A-92 are illustrated in this example, the disclosed embodiments are equally applicable to a situation where a sole UE is in the coverage area or where a sole UE is connecting to the corresponding base station A-12. In an aspect, any of these UEs, or any other UE described herein may be considered to be configured to perform the aspects of any UE, user terminal, client device, or mobile device described above in the present Application.

The telecommunication network A-10 is itself connected to a host computer A-30, which may be embodied in the hardware and/or software of a standalone server, a cloud-implemented server, a distributed server or as processing resources in a server farm. The host computer A-30 may be under the ownership or control of a service provider, may be operated by the service provider or on behalf of the service provider. The connections A-21, A-22 between the telecommunication network A-10 and the host computer A-30 may extend directly from the core network A-14 to the host computer A-30 or may go via an optional intermediate network A-20. The intermediate network A-20 may be one of, or a combination of more than one of, a public, private or hosted network; the intermediate network A-20, if any, may be a backbone network or the Internet; in particular, the intermediate network A-20 may comprise two or more sub-networks (not shown).

The communication system of FIG. 8 as a whole enables connectivity between one of the connected UEs A-91, A-92 and the host computer A-30. The connectivity may be described as an over-the-top (OTT) connection A-50. The host computer A-30 and the connected UEs A-91, A-92 are configured to communicate data and/or signaling via the OTT connection A-50, using the access network A-11, the core network A-14, any intermediate network A-20 and possible further infrastructure (not shown) as intermediaries. The OTT connection A-50 may be transparent in the sense that the participating communication devices through which the OTT connection A-50 passes are unaware of routing of uplink and downlink communications. For example, a base station A-12 may not or need not be informed about the past routing of an incoming downlink communication with data originating from a host computer A-30 to be forwarded (e.g., handed over) to a connected UE A-91. Similarly, the base station A-12 need not be aware of the future routing of an outgoing uplink communication originating from the UE A-91 towards the host computer A-30.

Figure 9:
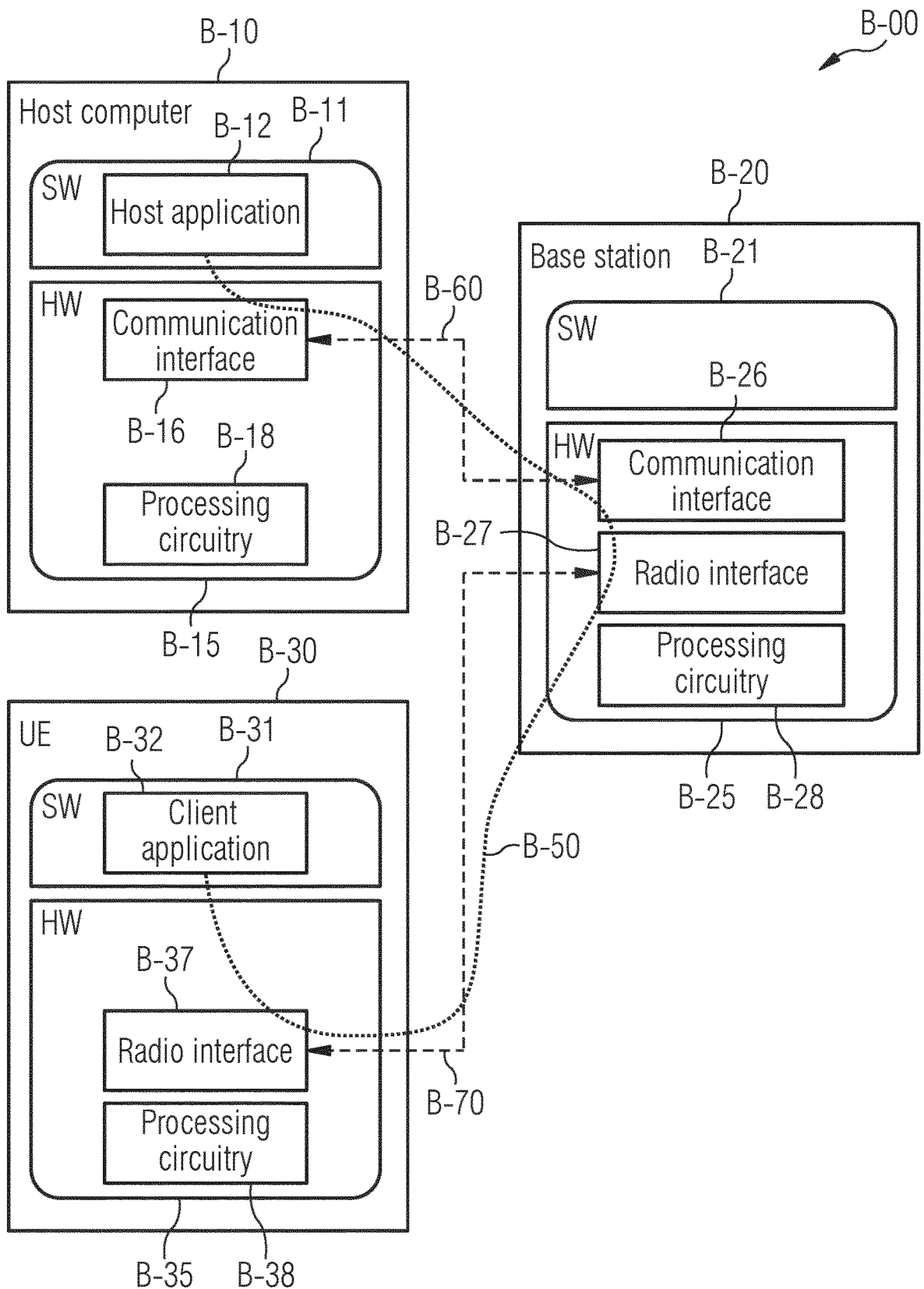
FIG. 9 is a generalized block diagram of a host computer communicating via a base station with a user equipment over a partially wireless connection.

Example implementations, in accordance with an embodiment, of the UE, base station and host computer discussed in the preceding paragraphs will now be described with reference to FIG. 9. FIG. 9 is a generalized block Diagram of a host computer communicating via a base station with a user equipment over a partially wireless connection.

With reference to FIG. 9, in a communication system B-00, a host computer B-10 comprises hardware B-15 including a communication interface B-16 configured to set up and maintain a wired or wireless connection with an interface of a different communication device of the communication system B-00. The host computer B-10 further comprises processing circuitry B-18, which may have storage and/or processing capabilities. In particular, the processing circuitry B-18 may comprise one or more programmable processors, application-specific integrated circuits, field programmable gate arrays or combinations of these (not shown) adapted to execute instructions. The host computer B-10 further comprises software B-11, which is stored in or accessible by the host computer B-10 and executable by the processing circuitry B-18. The software B-11 includes a host application B-12. The host application B-12 may be operable to provide a service to a remote user, such as a UE B-30 connecting via an OTT connection B-50 terminating at the UE B-30 and the host computer B-10. In providing the service to the remote user, the host application B-12 may provide user data which is transmitted using the OTT connection B-50.

The communication system B-00 further includes a base station B-20 provided in a telecommunication system and comprising hardware B-25 enabling it to communicate with the host computer B-10 and with the UE B-30. The hardware B-25 may include a communication interface B-26 for setting up and maintaining a wired or wireless connection with an interface of a different communication device of the communication system B-00, as well as a radio interface B-27 for setting up and maintaining at least a wireless connection B-70 with a UE B-30 located in a coverage area (not shown in FIG. 9) served by the base station B-20.

The communication interface B-26 may be configured to facilitate a connection B-60 to the host computer B-10. The connection B-60 may be direct or it may pass through a core network (not shown in FIG. 9) of the telecommunication system and/or through one or more intermediate networks outside the telecommunication system. In the embodiment shown, the hardware B-25 of the base station B-20 further includes processing circuitry B-28, which may comprise one or more programmable processors, application-specific integrated circuits, field programmable gate arrays or combinations of these (not shown) adapted to execute instructions.

The base station B-20 further has software B-21 stored internally or accessible via an external connection.

The communication system B-00 further includes the UE B-30, which has already been referred to above. Its hardware B-35 may include a radio interface B-37 configured to set up and maintain a wireless connection B-70 with a base station serving a coverage area in which the UE B-30 is currently located. The hardware B-35 of the UE B-30 further includes processing circuitry B-38, which may comprise one or more programmable processors, application-specific integrated circuits, field programmable gate arrays or combinations of these (not shown) adapted to execute instructions. The UE B-30 further comprises software B-31, which is stored in or accessible by the UE B-30 and executable by the processing circuitry B-38.

The software B-31 includes a client application B-32. The client application B-32 may be operable to provide a service to a human or non-human user via the UE B-30, with the support of the host computer B-10. In the host computer B-10, an executing host application B-12 may communicate with the executing client application B-32 via the OTT connection B-50 terminating at the UE B-30 and the host computer B-10. In providing the service to the user, the client application B-32 may receive request data from the host application B-12 and provide user data in response to the request data. The OTT connection B-50 may transfer both the request data and the user data. The client application B-32 may interact with the user to generate the user data that it provides.

It is noted that the host computer B-10, base station B-20 and UE B-30 illustrated in FIG. 9 may be identical to the host computer A-30, one of the base stations A-12a, A-12b, A-12c and one of the UEs A-91, A-92 of FIG. 8, respectively. This is to say, the inner workings of these entities may be as shown in FIG. 9 and independently, the surrounding network topology may be that of FIG. 8.

In FIG. 9, the OTT connection B-50 has been drawn abstractly to illustrate the communication between the host computer B-10 and the use equipment B-30 via the base station B-20, without explicit reference to any intermediary devices and the precise routing of messages via these devices. Network infrastructure may determine the routing, which it may be configured to hide from the UE B-30 or from the service provider operating the host computer B-10, or both. While the OTT connection B-50 is active, the network infrastructure may further take decisions by which it dynamically changes the routing (e.g., on the basis of load balancing consideration or reconfiguration of the network).

The wireless connection B-70 between the UE B-30 and the base station B-20 is in accordance with the teachings of the embodiments described throughout this disclosure. One or more of the various embodiments improve the performance of OTT services provided to the UE B-30 using the OTT connection B-50, in which the wireless connection B-70 forms the last segment. More precisely, the teachings of these embodiments can improve one or more of data rate, latency, and/or power consumption associated with one or more devices and/or communications of/performed in communication system B-00, and thereby can provide benefits for OTT user data communication, such as one or more of reduced user waiting time, relaxed restriction on file size, better responsiveness, and/or extended battery lifetime.

A measurement procedure may be provided for the purpose of monitoring data rate, latency and other factors on which the one or more embodiments improve. There may further be an optional network functionality for reconfiguring the OTT connection B-50 between the host computer B-10 and UE B-30, in response to variations in the measurement results. The measurement procedure and/or the network functionality for reconfiguring the OTT connection B-50 may be implemented in the software B-11 of the host computer B-10 or in the software B-31 of the UE B-30, or both.

In embodiments, sensors (not shown) may be deployed in or in association with communication devices through which the OTT connection B-50 passes; the sensors may participate in the measurement procedure by supplying values of the monitored quantities exemplified above, or supplying values of other physical quantities from which software B-11, B-31 may compute or estimate the monitored quantities. The reconfiguring of the OTT connection B-50 may include message format, retransmission settings, preferred routing etc.; the reconfiguring need not affect the base station B-20, and it may be unknown or imperceptible to the base station B-20. Such procedures and functionalities may be known and practiced in the art. In certain embodiments, measurements may involve proprietary UE signaling facilitating the host computer's B-10 measurements of throughput, propagation times, latency and the like. The measurements may be implemented in that the software B-11, B-31 causes messages to be transmitted, in particular empty or 'dummy' messages, using the OTT connection B-50 while it monitors propagation times, errors etc. FIGS. 10, 11, 12, and 13 are flowcharts illustrating methods implemented in a communication system including a host computer, a base station and a user equipment.

Figure 10:
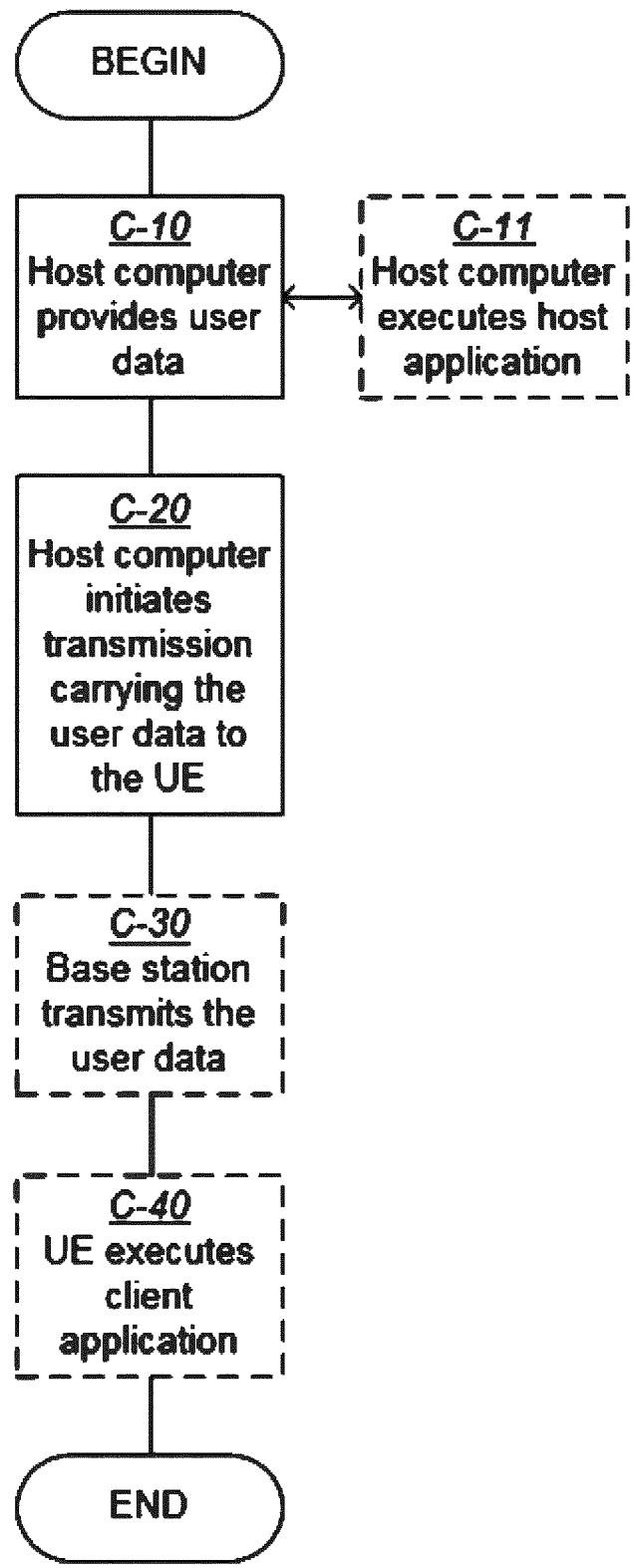
FIGS. 10 to 13 are flowcharts illustrating methods implemented in a communication system including a host computer, a base station and a user equipment.

FIG. 10 is a flowchart illustrating a method implemented in a communication system, in accordance with one embodiment.

The communication system includes a host computer, a base station and a UE which may be those described with reference to FIGS. 8 and 9. For simplicity of the present disclosure, only drawing references to FIG. 10 will be included in this section. In a first step C-10 of the method, the host computer provides user data.

In an optional substep C-11 of the first step C-10, the host computer provides the user data by executing a host application. In a second step C-20, the host computer initiates a transmission carrying the user data to the UE.

In an optional third step C-30, the base station transmits to the UE the user data which was carried in the transmission that the host computer initiated, in accordance with the teachings of the embodiments described throughout this disclosure. In an optional fourth step C-40, the UE executes a client application associated with the host application executed by the host computer.

Figure 11:
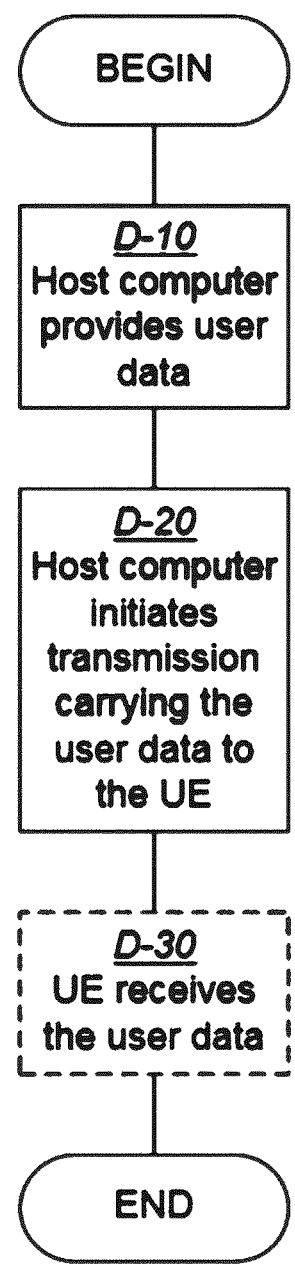

FIG. 11 is a flowchart illustrating a method implemented in a communication system, in accordance with one embodiment.

The communication system includes a host computer, a base station and a UE which may be those described with reference to FIGS. 8 and 9. For simplicity of the present disclosure, only drawing references to FIG. 11 will be included in this section. In a first step D-10 of the method, the host computer provides user data.

In an optional substep (not shown) the host computer provides the user data by executing a host application. In a second step D-20, the host computer initiates a transmission carrying the user data to the UE. The transmission may pass via the base station, in accordance with the teachings of the embodiments described throughout this disclosure. In an optional third step D-30, the UE receives the user data carried in the transmission.

Figure 12:
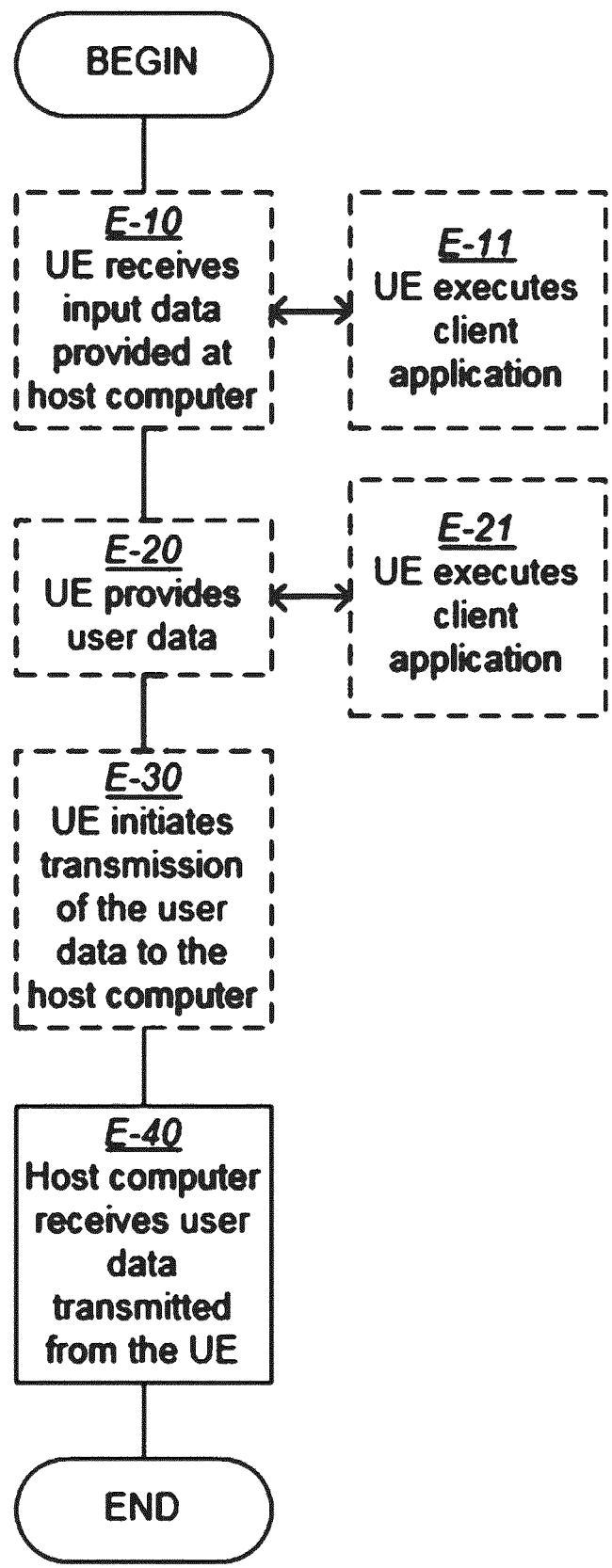

FIG. 12 is a flowchart illustrating a method implemented in a communication system, in accordance with one embodiment. The communication system includes a host computer, a base station and a UE which may be those described with reference to FIGS. 8 and 9. For simplicity of the present disclosure, only drawing references to FIG. 12 will be included in this section. In an optional first step E-10 of the method, the UE receives input data provided by the host computer. Additionally or alternatively, in an optional second step E-20, the UE provides user data. In an optional substep E-21 of the second step E-20, the UE provides the user data by executing a client application. In a further optional substep E-11 of the first step E-10, the UE executes a client application which provides the user data in reaction to the received input data provided by the host computer. In providing the user data, the executed client application may further consider user input received from the user. Regardless of the specific manner in which the user data was provided, the UE initiates, in an optional third substep E-30, transmission of the user data to the host computer. In a fourth step E-40 of the method, the host computer receives the user data transmitted from the UE, in accordance with the teachings of the embodiments described throughout this disclosure.

Figure 13:
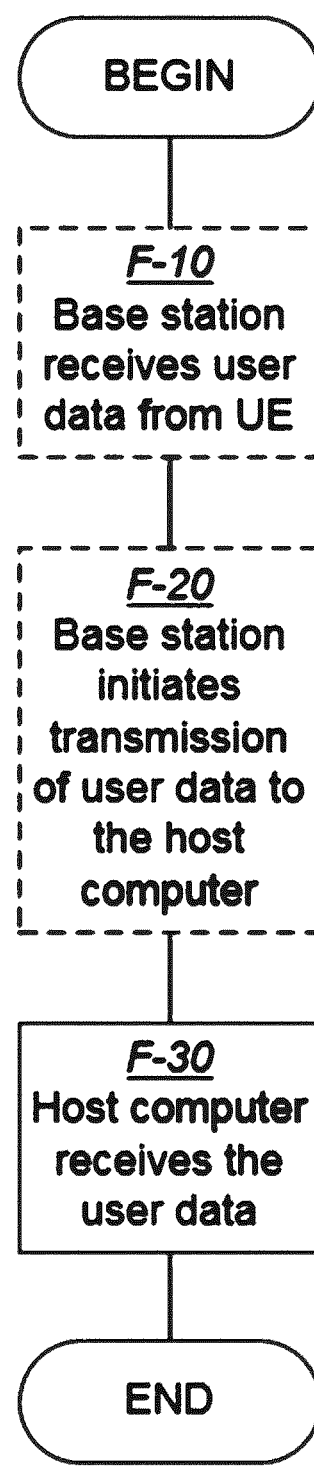

FIG. 13 is a flowchart illustrating a method implemented in a communication system, in accordance with one embodiment. The communication system includes a host computer, a base station and a UE which may be those described with reference to FIGS. 8 and 9. For simplicity of the present disclosure, only drawing references to FIG. 13 will be included in this section. In an optional first step F-10 of the method, in accordance with the teachings of the embodiments described throughout this disclosure, the base station receives user data from the UE. In an optional second step F-20, the base station initiates transmission of the received user data to the host computer. In a third step F-30, the host computer receives the user data carried in the transmission initiated by the base station.

Further exemplary embodiments are listed in the following:

A-1. A base station configured to communicate with a user equipment (UE), the base station comprising a radio interface and processing circuitry configured to perform aspects of example embodiments described throughout the present disclosure.

A-2. A communication system including a host computer comprising:
  processing circuitry configured to provide user data; and
  a communication interface configured to forward the user data to a cellular network for transmission to a user equipment (UE),
  wherein the cellular network comprises a base station having a radio interface and processing circuitry, the base station's processing circuitry configured to perform aspects of example embodiments described throughout the present disclosure, including aspects related to forwarding the user data to the UE.

A-3. The communication system of embodiment A-2, further including the base station.

A-4. The communication system of embodiment A-3, further including the UE, wherein the UE is configured to communicate with the base station.

A-5. The communication system of embodiment A-4, wherein:
  the processing circuitry of the host computer is configured to execute a host application, thereby providing the user data; and
  the UE comprises processing circuitry configured to execute a client application associated with the host application.

A-6. A method implemented in a base station, comprising aspects of example embodiments described throughout the present disclosure, including aspects related to transmitting user data to a UE.

A-7. A method implemented in a communication system including a host computer, a base station and a user equipment (UE), the method comprising:
  at the host computer, providing user data; and
  at the host computer, initiating a transmission carrying the user data to the UE via a cellular network comprising the base station, wherein the base station is configured to perform aspects of example embodiments described throughout the present disclosure, included aspects related to transmitting the user data to the UE.

A-8. The method of embodiment A-7, further comprising:
  at the base station, transmitting the user data.

A-9. The method of embodiment A-8, wherein the user data is provided at the host computer by executing a host application, the method further comprising:
  at the UE, executing a client application associated with the host application.

A-10. A user equipment (UE) configured to communicate with a base station, the UE comprising a radio interface and processing circuitry configured to perform aspects of example embodiments described throughout the present disclosure, including aspects related to receiving user data from the base station.

A-11. A communication system including a host computer comprising:
  processing circuitry configured to provide user data; and
  a communication interface configured to forward user data to a cellular network for transmission to a user equipment (UE),
  wherein the UE comprises a radio interface and processing circuitry, the UE's processing circuitry configured to perform aspects of example embodiments described throughout the present disclosure, including aspects related to the UE receiving the user data from the base station.

A-12. The communication system of embodiment A-11, further including the UE.

A-13. The communication system of embodiment A-12, wherein the cellular network further includes a base station configured to communicate with the UE.

A-14. The communication system of embodiment A-12 or A-13, wherein:
  the processing circuitry of the host computer is configured to execute a host application, thereby providing the user data; and
  the UE's processing circuitry is configured to execute a client application associated with the host application.

A-15. A method implemented in a user equipment (UE), comprising aspects of example embodiments described throughout the present disclosure, including aspects related to the UE receiving user data from a base station.

A-16. A method implemented in a communication system including a host computer, a base station and a user equipment (UE), the method comprising:
  at the host computer, providing user data; and
  at the host computer, initiating a transmission carrying the user data to the UE via a cellular network comprising the base station, wherein the UE is configured to perform aspects of example embodiments described throughout the present disclosure, including aspects related to the UE receiving the user data from the base station.

A-17. The method of embodiment A-16, further comprising:
  at the UE, receiving the user data from the base station.

A-18. A user equipment (UE) configured to communicate with a base station, the UE comprising a radio interface and processing circuitry configured to perform aspects of example embodiments described throughout the present disclosure, including aspects related to the UE transmitting user data to the base station.

A-19. A communication system including a host computer comprising:
  a communication interface configured to receive user data originating from a transmission from a user equipment (UE) to a base station,
  wherein the UE comprises a radio interface and processing circuitry, the UE's processing circuitry configured to perform aspects of example embodiments described throughout the present disclosure, including aspects related to the UE transmitting user data to the base station.

A-20. The communication system of embodiment A-19, further including the UE.

A-21. The communication system of embodiment A-20, further including the base station, wherein the base station comprises a radio interface configured to communicate with the UE and a communication interface configured to forward to the host computer the user data carried by a transmission from the UE to the base station.

A-22. The communication system of embodiment A-20 or A-21, wherein:
  the processing circuitry of the host computer is configured to execute a host application; and
  the UE's processing circuitry is configured to execute a client application associated with the host application, thereby providing the user data.

A-23. The communication system of embodiment A-20 or A-21, wherein:
  the processing circuitry of the host computer is configured to execute a host application, thereby providing request data; and
  the UE's processing circuitry is configured to execute a client application associated with the host application, thereby providing the user data in response to the request data.

A-24. A method implemented in a user equipment (UE), comprising aspects of example embodiments described throughout the present disclosure, including aspects related to the UE transmitting user data to a base station.

A-25. The method of embodiment A-24, further comprising:
  providing user data; and
  forwarding the user data to a host computer via the transmission to the base station.

A-26. A method implemented in a communication system including a host computer, a base station and a user equipment (UE), the method comprising:
  at the host computer, receiving user data transmitted to the base station from the UE, wherein the UE is configured to perform aspects of example embodiments described throughout the present disclosure, including aspects related to the UE transmitting user data to the base station.

A-27. The method of embodiment A-26, further comprising:
  at the UE, providing the user data to the base station.

A-28. The method of embodiment A-27, further comprising:
  at the UE, executing a client application, thereby providing the user data to be transmitted; and
  at the host computer, executing a host application associated with the client application.

A-29. The method of embodiment A-27, further comprising:
  at the UE, executing a client application; and
  at the UE, receiving input data to the client application, the input data being provided at the host computer by executing a host application associated with the client application,
  wherein the user data to be transmitted is provided by the client application in response to the input data.

A-30. A base station configured to communicate with a user equipment (UE), the base station comprising a radio interface and processing circuitry configured to perform aspects of example embodiments described throughout the present disclosure, including aspects related to the base station receiving user data from the UE.

A-31. A communication system including a host computer comprising a communication interface configured to receive user data originating from a transmission from a user equipment (UE) to a base station, wherein the base station comprises a radio interface and processing circuitry, the base station's processing circuitry configured to perform aspects of example embodiments described throughout the present disclosure, including aspects related to the base station receiving user data from the UE.

A-32. The communication system of embodiment A-31, further including the base station.

A-33. The communication system of embodiment A-32, further including the UE, wherein the UE is configured to communicate with the base station.

A-34. The communication system of embodiment A-33, wherein:

the processing circuitry of the host computer is configured to execute a host application;

the UE is configured to execute a client application associated with the host application, thereby providing the user data to be received by the host computer.

A-35. A method implemented in a base station, comprising perform aspects of example embodiments described throughout the present disclosure, including aspects related to the base station receiving user data from a user equipment (UE).

A-36. A method implemented in a communication system including a host computer, a base station and a user equipment (UE), the method comprising:

at the host computer, receiving, from the base station, user data originating from a transmission which the base station has received from the UE, wherein one or both of the base station and the UE are configured to perform aspects of example embodiments described throughout the present disclosure, including aspects related to the base station receiving user data from the UE and/or aspects related to the UE transmitting user data to the base station.

A-37. The method of embodiment A-36, further comprising:

at the base station, receiving the user data from the UE.

A-38. The method of embodiment A-37, further comprising:

at the base station, initiating a transmission of the received user data to the host computer.

As has become apparent from the above, the present disclosure provides a technique for configuring a random access procedure to be performed by a UE when handing over from a serving cell to a target cell in a cellular network. The presented technique may extend existing frameworks for handover procedures to support two-step random access, e.g., by including the signaling details described above. The presented technique may enable base stations to select among a plurality of possible random access types, such as a two-step random access procedure and a four-step random access procedure, to configure a random access type for a UE that is most suitable for the handover in a particular situation, e.g., taking into account respective advantages and disadvantages of two-step and four-step random access procedures (e.g., as described in the background section above), entailing that one procedure may be preferable over another procedure depending on the circumstances. As such, the technique presented herein may be used to ensure differentiated latency requirements considering LBT impact, especially as observed in NR-U systems, for example.

It is believed that the advantages of the technique presented herein will be fully understood from the foregoing description, and it will be apparent that various changes may be made in the form, constructions and arrangement of the exemplary aspects thereof without departing from the scope of the invention or without sacrificing all of its advantageous effects. Because the technique presented herein can be varied in many ways, it will be recognized that the invention should be limited only by the scope of the claims that follow.

The invention claimed is:

1. A method for configuring a random access procedure to be performed by a user equipment (UE) when handing over from a serving cell to a target cell in a cellular network, the method being performed by a base station associated with the serving cell and comprising: determining whether a load and/or a channel occupancy in the target cell is below a predetermined threshold; as a result of determining that the load and/or the channel occupancy in the target cell is below the predetermined threshold, selecting a two-step random access procedure from among a plurality of types of random access procedures; and triggering sending, to the UE, a message related to the handover from the serving cell to the target cell, the message including an indication of a preferred type of random access procedure to be performed by the UE with the target cell, wherein the preferred type of random access procedure corresponds to the two-step random access procedure, wherein the message includes one or more parameters defining characteristics of the two-step random access procedure to be performed by the UE with the target cell, and the one or more parameters include at least one of: a parameter indicating whether a demodulation reference signal (DMRS) is to be included in a first message of the two-step random access procedure sent from the UE to the target cell, or a parameter indicating which among a plurality of DMRSs configured by the cellular network is to be selected as the DMRS to be included in the first message.

2. The method of claim 1, wherein the two-step random access procedure is selected among a plurality of types of random access procedures depending on one or more suitability criteria for the handover to be performed, wherein the plurality of random access procedures comprise the two-step random access procedure and a four-step random access procedure.

3. The method of claim 1, wherein the two-step random access procedure is selected among the plurality of types of random access procedures by one of:

a selection made by the base station associated with the serving cell, a selection made by the base station associated with the target cell, and a combined selection made by both the base station associated with the serving cell and the base station associated with the target cell.

4. The method of claim 1, further comprising:

triggering coordinating the one or more suitability criteria with the base station associated with the target cell.

5. The method of claim 1, wherein the one or more parameters include:

a parameter indicating whether a demodulation reference signal (DMRS) is to be included in a first message of the two-step random access procedure sent from the UE to the target cell.

6. The method of claim 5, wherein plural bandwidths parts (BWPs) are configured in the target cell, and wherein the one or more parameters are provided per BWP among the plural BWPs.

7. The method of claim 6, wherein the message further includes a rule for selection, by the UE, of one of the plural BWPs, for the two-step random access procedure.

8. A base station associated with a serving cell for configuring a random access procedure to be performed by a user equipment, UE, when handing over from the serving cell to a target cell in a cellular network, the base station comprising at least one processor and at least one memory, the at least one memory containing instructions executable by the at least one processor such that the base station is operable to perform the method of claim 1.

9. The method of claim 1, wherein the one or more parameters include a parameter indicating at least one resource for payload transmission in the first message.

10. The method of claim 1, wherein the one or more parameters include a parameter indicating enabling of early data transmission.

11. The method of claim 1, wherein the one or more parameters include a parameter relating to performing a listen before talk (LBT) operation.

12. A method for configuring a random access procedure to be performed by a user equipment (UE) when handing over from a serving cell to a target cell in a cellular network, the method being performed by the UE and comprising: receiving from a base station a message related to the handover from the serving cell to the target cell, the message including an indication of a preferred type of random access procedure to be performed by the UE with the target cell, wherein the preferred type of random access procedure corresponds to a two-step random access procedure, wherein the message includes one or more parameters defining characteristics of the two-step random access procedure to be performed by the UE with the target cell, and the one or more parameters include at least one of: a parameter indicating whether a demodulation reference signal (DMRS) is to be included in a first message of the two-step random access procedure sent from the UE to the target cell, or a parameter indicating which among a plurality of DMRSs configured by the cellular network is to be selected as the DMRS to be included in the first message.

13. The method of claim 12, further comprising:
performing the handover from the serving cell to the target cell in accordance with the two-step random access procedure.

14. The method of claim 12, wherein the base station is a base station associated with the target cell and wherein the message corresponds to a paging message received from the base station.

15. The method of claim 12, wherein the one or more parameters include
a parameter indicating which among a plurality of DMRSs configured by the cellular network is to be selected as the DMRS to be included in the first message.

16. A user equipment, UE, for configuring a random access procedure to be performed by the UE when handing over from a serving cell to a target cell in a cellular network, the UE comprising at least one processor and at least one memory, the at least one memory containing instructions executable by the at least one processor such that the UE is operable to perform the method of claim 12.

17. A method for configuring a random access procedure to be performed by a user equipment (UE) when handing over from a serving cell to a target cell in a cellular network, the method being performed by a base station associated with the target cell and comprising:
coordinating one or more suitability criteria with a base station associated with the serving cell, the one or more suitability criteria being used to select a two-step random access procedure among a plurality of types of random access procedures, wherein the two-step random access procedure corresponds to a preferred type of random access procedure to be performed by the UE with the target cell; and
the base station associated with the target cell providing to the base station associated with the serving cell one or more parameters defining characteristics of the two-step random access procedure,
wherein the one or more parameters include at least one of:
a parameter indicating whether a demodulation reference signal (DMRS) is to be included in a first message of the two-step random access procedure sent from the UE to the target cell, or
a parameter indicating which among a plurality of DMRSs configured by the cellular network is to be selected as the DMRS to be included in the first message.

18. The method of claim 17, wherein the plurality of random access procedures comprise the two-step random access procedure and a four-step random access procedure.

19. The method of claim 17, wherein the one or more suitability criteria relate to at least one of:
one or more random access related capabilities of the UE,
one or more random access related capabilities of a base station associated with the target cell, and
one or more quality requirements related to a connection between the UE and the serving cell.

20. A base station associated with a target cell for configuring a random access procedure to be performed by a user equipment, UE, when handing over from a serving cell to the target cell in a cellular network, the base station comprising at least one processor and at least one memory, the at least one memory containing instructions executable by the at least one processor such that the base station is operable to perform the method of claim 17.

* * * * *